United States Patent
Baerlocher et al.

(10) Patent No.: US 12,154,410 B2
(45) Date of Patent: Nov. 26, 2024

(54) LOTTERY OFFERINGS DISPLAYED ON GAME PRESENTATION DEVICES IN A NON-GAMING ESTABLISHMENT ENVIRONMENT

(71) Applicant: IGT, Las Vegas, NV (US)

(72) Inventors: Anthony Baerlocher, Henderson, NV (US); Luigi Cacciapuoti, Las Vegas, NV (US)

(73) Assignee: IGT, Las Vegas, NV (US)

( * ) Notice: Subject to any disclaimer, the term of this patent is extended or adjusted under 35 U.S.C. 154(b) by 253 days.

(21) Appl. No.: 17/949,519

(22) Filed: Sep. 21, 2022

(65) Prior Publication Data

US 2024/0096173 A1    Mar. 21, 2024

(51) Int. Cl.
  *G07F 17/32*  (2006.01)
  *G06Q 20/10*  (2012.01)
  *G06Q 20/20*  (2012.01)
  *G06Q 50/34*  (2012.01)

(52) U.S. Cl.
  CPC ......... *G07F 17/3244* (2013.01); *G06Q 20/10* (2013.01); *G06Q 20/20* (2013.01); *G06Q 50/34* (2013.01); *G07F 17/3211* (2013.01); *G07F 17/329* (2013.01)

(58) Field of Classification Search
  CPC ...................................................... G07F 17/32
  See application file for complete search history.

(56) References Cited

U.S. PATENT DOCUMENTS

| | | |
|---|---|---|
| 6,280,328 B1 | 8/2001 | Holch et al. |
| 6,508,710 B1 | 1/2003 | Paravia et al. |
| 6,773,345 B2 | 8/2004 | Walker et al. |
| 7,192,348 B2 | 3/2007 | Brosnan et al. |
| 7,291,069 B2 | 11/2007 | Michaelson et al. |
| 7,329,183 B2 | 2/2008 | Michaelson et al. |
| 7,628,703 B2 | 12/2009 | Wolf et al. |
| 8,251,824 B2 | 8/2012 | Michaelson et al. |
| 8,512,135 B2 | 8/2013 | Anderson et al. |
| 8,932,129 B2 | 1/2015 | Powell et al. |
| 9,005,011 B2 | 4/2015 | Gagner et al. |
| 9,508,219 B2 | 11/2016 | Garvey et al. |
| 9,767,643 B2 | 9/2017 | Miltenberger et al. |
| 9,824,346 B2 | 11/2017 | Zygula |
| 10,019,871 B2 | 7/2018 | Arnone et al. |
| 10,032,334 B2 | 7/2018 | Cuddy et al. |
| 10,037,656 B2 | 7/2018 | Boudreau et al. |
| 10,360,768 B2 | 7/2019 | Saccoccio et al. |
| 10,593,153 B2 | 3/2020 | Shenker et al. |
| 10,783,744 B2 | 9/2020 | Asher et al. |
| 11,100,758 B2 | 8/2021 | Baggesen-Jensen et al. |
| 11,158,172 B2 | 10/2021 | Ghia |
| 11,200,784 B2 | 12/2021 | Gotlieb et al. |
| 2004/0152511 A1 | 8/2004 | Nicely et al. |
| 2006/0111172 A1 | 5/2006 | Walker et al. |
| 2008/0076528 A1 | 3/2008 | Nguyen et al. |
| 2014/0370970 A1 | 12/2014 | Adiraju et al. |
| 2017/0323704 A1 | 11/2017 | Ovalle |

(Continued)

*Primary Examiner* — Omkar A Deodhar
(74) *Attorney, Agent, or Firm* — Neal, Gerber & Eisenberg LLP

(57) ABSTRACT

Systems and methods that employ a cloud-based central determination server to provide predetermined game outcomes displayed at a game presentation device operating with a remote game server and a balance management server in association with funds transacted at a point-of-sale terminal.

20 Claims, 9 Drawing Sheets

(56) References Cited

U.S. PATENT DOCUMENTS

2021/0264725 A1 8/2021 Gotlieb et al.
2022/0058912 A1 2/2022 Gotlieb et al.
2022/0148371 A1 5/2022 Gotlieb et al.

LOTTERY OFFERINGS DISPLAYED ON GAME PRESENTATION DEVICES IN A NON-GAMING ESTABLISHMENT ENVIRONMENT

CROSS-REFERENCE TO RELATED APPLICATIONS

This application is related to the following commonly owned co-pending patent applications: U.S. application Ser. No. 17/949,497, entitled "PREDETERMINED GAME OUTCOMES DISPLAYED BY A GAME PRESENTATION DEVICE IN A NON-GAMING ESTABLISHMENT ENVIRONMENT,"; and U.S. application Ser. No. 17/949,510, entitled "CENTRAL DETERMINATION GAMING FOR GAME PRESENTATION DEVICES IN A NON-GAMING ESTABLISHMENT ENVIRONMENT".

BACKGROUND

In various embodiments, the systems and methods of the present disclosure employ a cloud-based central determination server to provide predetermined game outcomes displayed at a game presentation device operating with a remote game server and a balance management server in association with funds transacted at a point-of-sale terminal.

Electronic gaming machines generally require a player to place a wager to activate a game. An award for the activated game may be based on obtaining a winning symbol combination and on an amount of the wager placed.

BRIEF SUMMARY

In certain embodiments, the present disclosure relates to a system including a processor, and a memory device that stores a plurality of instructions. When executed by the processor responsive to a receipt of data associated with a redemption of a gameplay ticket voucher issued from a point-of-sale terminal, the instructions cause the processor to communicate data that results in a display device of a game presentation device displaying, based on a first amount of non-cashable funds associated with the gameplay ticket voucher, a modification of a first balance of non-cashable funds dedicated to a quantity of plays of lottery games offered by a lottery authority. In these embodiments, when redeemed, the gameplay ticket voucher is independent of any individual plays of any individual lottery games. When executed by the processor responsive to a receipt of data associated with an input to allocate at least part of the first amount of non-cashable funds associated with the gameplay ticket voucher to a play of a lottery game offered by the lottery authority and a determination that the first balance of non-cashable funds at least equals a cost associated with the play of the lottery game, the instructions cause the processor to communicate, to a remote game server, data authorizing the play of the lottery game, and communicate data that results in the display device of the game presentation device displaying, based on the cost associated with the play of the lottery game, a further modification of the first balance of non-cashable funds. When executed by the processor responsive to a receipt, from the remote game server, of data associated with a predetermined game outcome associated with a game outcome seed selected by a cloud-based central determination system server from a set of game outcome seeds, the instructions cause the processor to communicate data that results in the display device of the game presentation device displaying, based on any value component associated with the predetermined game outcome, a modification of a second balance of a first amount of cashable funds.

In certain embodiments, the present disclosure relates to a system including a processor, and a memory device that stores a plurality of instructions. When executed by the processor, the instructions cause the processor to communicate, to a balance management server, a request to allocate at least part of a first amount of non-cashable funds associated with a gameplay ticket voucher to a play of a lottery game offered by a lottery authority, the gameplay ticket voucher being issued by a point-of-sale terminal and redeemed in association with a game presentation device. In these embodiments, when redeemed, the gameplay ticket voucher is independent of any individual plays of any individual lottery games and the first amount of non-cashable funds is dedicated to funding plays of lottery games offered by the lottery authority. When executed by the processor responsive to a receipt, from the balance management server, of an authorization of the request, the instructions cause the processor to communicate, to a cloud-based central determination system server, a request for a game outcome seed from a set of game outcome seeds. When executed by the processor responsive to a receipt, from the cloud-based central determination system server, of data associated with the game outcome seed, the instructions cause the processor to determine a predetermined game outcome from the data associated with the game outcome seed, communicate data that results in a display device of the game presentation device displaying the predetermined game outcome, and communicate, to the balance management server, data associated with any value component of the predetermined game outcome.

In certain embodiments, the present disclosure relates to a method of operating a system. Responsive to a receipt of data associated with a redemption of a gameplay ticket voucher issued from a point-of-sale terminal, the method includes communicating data that results in a display device of a game presentation device displaying, based on a first amount of non-cashable funds associated with the gameplay ticket voucher, a modification of a first balance of non-cashable funds dedicated to a quantity of plays of lottery games offered by a lottery authority. When redeemed, the gameplay ticket voucher is independent of any individual plays of any individual lottery games. Responsive to a receipt of data associated with an input to allocate at least part of the first amount of non-cashable funds associated with the gameplay ticket voucher to a play of a lottery game offered by the lottery authority and a determination that the first balance of non-cashable funds at least equals a cost associated with the play of the lottery game, the method includes communicating, to a remote game server, data authorizing the play of the lottery game, and communicating data that results in the display device of the game presentation device displaying, based on the cost associated with the play of the lottery game, a further modification of the first balance of non-cashable funds. Responsive to a receipt, from the remote game server, of data associated with a predetermined game outcome associated with a game outcome seed selected by a cloud-based central determination system server from a set of game outcome seeds, the method includes communicating data that results in the display device of the game presentation device displaying, based on any value component associated with the predetermined game outcome, a modification of a second balance of a first amount of cashable funds.

Additional features are described in, and will be apparent from, the following Detailed Description and the figures.

DETAILED DESCRIPTION

Figure 1A:
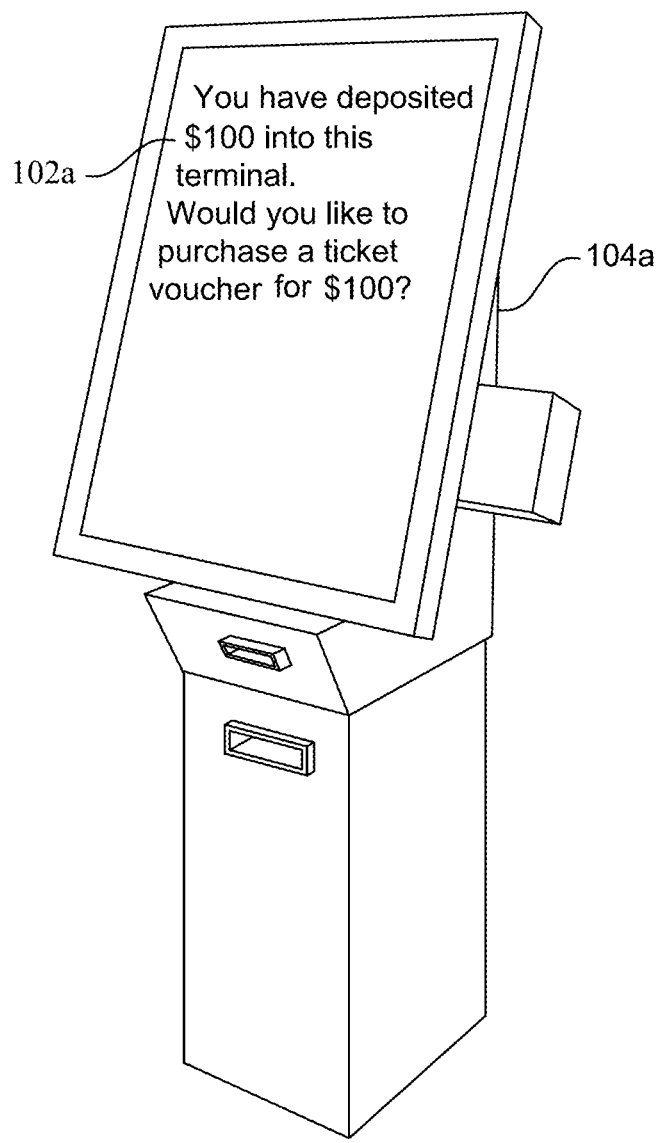
FIG. 1A is a perspective view of one example embodiment of a self-service point-of-sale terminal of the present disclosure.

In various embodiments, the present disclosure relates generally to systems and methods that employ a cloud-based central determination system ("CDS") server to provide predetermined game outcomes displayed at a game presentation device in association with funds transacted at a point-of-sale terminal.

In certain embodiments, the system of the present disclosure comprises a cloud-based CDS server that maintains one or more game outcome seed sets or pools. Each game outcome seed set includes a plurality of game outcome seeds. Each game outcome seed is deterministic of a predetermined game outcome. The cloud-based CDS server operates to distribute game outcome seeds to one or more remote game servers which distribute associated predetermined game outcomes to one or more game presentation devices for one or more plays of one or more games.

In certain embodiments, the system of the present disclosure also comprises one or more point-of-sale terminals at one or more non-gaming establishment locations, such as a retail establishment authorized to enable pull-tab lottery games but not authorized to enable probability-based gaming (e.g., Class III) games. Each point-of-sale terminal operates to handle the fund transactions associated with procuring game outcome seeds from the cloud-based CDS server and/or cashing out any winnings associated with any procured game outcome seeds. In certain such embodiments, the point-of-sale terminal enables a user to deposit an amount of funds in exchange for a ticket voucher associated with the deposited amount of funds. In certain such embodiments, each point-of-sale terminal additionally or alternatively enables a user to redeem a ticket voucher generated by a game presentation device (or generated by a remote game server and delivered by the game presentation device) for an amount of funds cashed out using the game presentation device.

In certain embodiments, the system of the present disclosure further comprises one or more remote game servers in communication with one or more game presentation devices at one or more locations such as non-gaming establishment locations. In certain instances, each game presentation device is a non-regulatory approved device operable to deliver, via the display of one or more plays of one or more games, one or more predetermined game outcomes associated with one or more game outcome seeds distributed by the cloud-based CDS server to the remote game server. In certain embodiments, following the selection of a game to be played and the authorization of available funds associated with the selected game to be played, the game presentation device interfaces with a remote game server that interfaces with the cloud-based CDS server to obtain one or more game outcome seeds. The remote game server utilizes each received game outcome seed to determine a predetermined game outcome associated with a predetermined award. The remote game server then operates with a game presentation device to cause the display of the predetermined game outcome associated with the predetermined award by the game presentation device. In these embodiments, the cloud-based CDS server delivers a game outcome seed to the remote game server and the remote game server determines, based on the delivered game outcome seed, a predetermined game outcome to be presented to the user via the game presentation device. As such, any regulated approved gaming software operates on the remote game server (and/or the cloud-based CDS server) and not on the game presentation device (which operates as a content delivery device that interfaces with users).

In certain embodiments, the system of the present disclosure additionally comprises one or more balance management servers that establish an amount to be wagered responsive to a receipt, by the game presentation device, of a ticket voucher procured at a point-of-sale terminal. In these embodiments, each game presentation device displays one or more established fund balances (e.g., a balance of funds available to wager and a balance of funds from any awards associated with predetermined game outcomes displayed by the game presentation device) maintained by the balance management server. That is, similar to how the game presentation device is employed as a content delivery device of predetermined game outcomes processed by the remote game server, the game presentation device further operates as a fund balance display device of one or more balances maintained by the balance management server. In these embodiments, in addition to operating as an interface to enable a user to select a wager amount to potentially be placed on a selected game to be played, the game presentation device operates as an interface to enable the user to cash out one or more balances (maintained by the balance management server) in exchange for a ticket voucher that is redeemable for funds at a point-of-sale terminal. In these embodiments, the balance management server (and/or the remote game server) maintains the funds balances used for wagering and winning with such amounts presented to the user via the game presentation device.

In operation of various embodiments, upon receiving an amount of funds associated with a user (with or without the user identifying themselves to potentially accrue benefits associated with undertaken activities), the point-of-sale terminal issues a ticket voucher (in physical or virtual form) associated with the received amount of funds. In certain embodiments, the amount of funds are physically deposited into the point-of-sale terminal and/or transferred to the point-of-sale terminal (or an account associated with the point-of-sale terminal) from one or more accounts associated with the user. For example, following a user interfacing with a mobile device to facilitate a transfer of $50 from a cashless account associated with the user and maintained by a cashless system to an account associated with the pointof-sale terminal, the point-of-sale terminal issues a ticket voucher associated with a value of $50. In certain embodiments, when issued, the ticket voucher is not associated with any particular games to be played nor any particular predetermined game outcomes purchased. That is, the ticket voucher issued from the point-of-sale terminal is, at that point in time, independent of any identifiable game and any identifiable game outcome (and rather represents an amount to be subsequently allocated to one or more games that present one or more predetermined game outcomes). In these embodiments, when issued, the ticket voucher is associated with a balance of funds committed by the user to be used to purchase predetermined game outcomes for one or more subsequently identified games to be played at one or more subsequently identified wager amounts. Accordingly, in certain embodiments, while issued in association with a receipt of an amount of monetary funds, when issued, the ticket voucher is associated with a dedicated balance of non-monetary funds that must be used or played through a game presentation device to potentially be converted back to an amount of monetary funds then available to the user.

Following the issuance of a ticket voucher associated with an amount of funds and a receipt of the ticket voucher by a game presentation device, the game presentation device operates with a balance management server to display the dedicated balance of the amount of funds associated with the ticket voucher. The game presentation device also operates with the remote game server and/or the balance management server to enable the user to select a quantity of plays of one or more games at one or more wager amounts (i.e., a quantity of predetermined game outcomes to purchase) using part or all of the displayed balance of the amount of funds. In these embodiments, different games available to be played are associated with different wager amounts (i.e., different costs) such that the amount of a displayed balance used to cover the cost of the purchased predetermined game outcomes is based on the quantity of game plays purchased and the cost of each respective game play. For example, following the redemption at the game presentation device of a ticket voucher purchased from the point-of-sale terminal associated with a value of $50 (that results in the balance management server establishing a balance of $50 that is displayed by the game presentation device and represents an amount committed by the user to be played through by the user), the game presentation device operates with the balance management server to enable the user to use the $50 to purchase, sequentially and/or as a batch purchase, different combinations of different games costing from $1 to $10 that collectively cost $50.

In certain embodiments, following the purchase of one or more plays of a game and the corresponding reduction of the dedicated balance maintained by the balance management server (which is displayed by the game presentation device) to reflect the costs of such purchased plays (and following any reporting of the purchase to the point-of-sale terminal and/or a server of a point-of-sale system that the point-of-sale terminal is associated with), the game presentation device operates with the remote game server to request one or more game outcome seeds from the cloud-based CDS server that maintains one or more sets of game outcome seeds. In these embodiments, the cloud-based CDS server selects, from the set of game outcome seeds associated with the purchased plays of the game, a corresponding quantity of game outcome seeds and communicates data associated with the selected game outcome seeds to the remote game server. For example, if the user purchased ten plays of a $5 game, the cloud-based CDS server selects ten game outcome seeds from a game outcome seed set associated with the $5 game and communicates data associated with the ten selected game outcome seeds to the remote game server. Once selected, the cloud-based CDS server designates each selected game outcome seed which prevents that selected game outcome seed from being selected again from that game outcome seed set.

In certain embodiments, following the receipt of one or more selected game outcome seeds (and following any reporting of the selected game outcome seeds to the point-of-sale terminal and/or a server of a point-of-sale system that the point-of-sale terminal is associated with), for each selected game outcome seed, the remote game server operates with the game presentation device to displays to the user a play of a game that results in a predetermined game outcome determined by the remote game server from that selected game outcome seed. In these embodiments, since each game outcome seed is deterministic of a predetermined game outcome, the remote game server employs the selected game outcome seed to determine the associated predetermined game outcome. The remote game server then operates with the game presentation device to display the associated predetermined game outcome. In certain embodiments, to mimic the experience of playing a probability-based game, the game presentation device displays the predetermined game outcome received from the remote game server in association with a play of a game that uses one or more random determinations, such as by displaying a game including spinning a plurality of reels to display a symbol combination associated with an award having a value equal to a value component of the predetermined game outcome determined from the game outcome seed communicated from the cloud-based CDS server to the remote game server.

In addition to employing the game presentation device to display the predetermined game outcome and any associated award, the remote game server operates with the balance management server to modify a balance maintained by the balance management server for any value component of the predetermined game outcome. In certain embodiments, the remote game server, the balance management server and/or the game presentation device further communicates data regarding the displayed predetermined game outcome and/or any value component of the predetermined game outcome to the point-of-sale terminal (and/or a server of a point-of-sale system that the point-of-sale terminal is associated with).

In various embodiments, in addition to operating as a delivery device for predetermined game outcomes purchased in association with a transaction occurring at a point-of-sale terminal, the game presentation device operates as an interface to enable a user to cashout one or more balances maintained by the balance management server. In certain embodiments, the balance management server maintains separate and independent balances, displayed as separate credit meters and/or as a combined credit meter by the game presentation device, for the user dedicated funds available for wagering at the game presentation device (i.e., a balance of funds purchased by the user from the point-of-sale terminal and that in certain embodiments is non-refundable to the user) and funds displayed as won at the game presentation device (i.e., a balance of funds comprising any value components of any predetermined game outcomes determined from any game outcome seeds selected by the cloud-based CDS server and that is payable to the user).

In certain embodiments, following receipt of a cashout input, the game presentation device operates with the balance management server and the point-of-sale terminal (and/or a server of a point-of-sale system that the point-of-sale terminal is associated with) to make the amount of funds of the cashed out balance(s) of funds available to the user. In certain such embodiments, the balance management server instructs the game presentation device to issue a ticket voucher (in physical or virtual form) associated with the amount of funds of the cashed out balance(s) of funds. In one such embodiment, the issued ticket voucher is redeemable at the point-of-sale terminal for an amount of currency associated with the amount of funds of the cashed out balance(s) of funds. In another such embodiment, the issued ticket voucher is redeemable at the point-of-sale terminal which then operates with one or more servers to transfer the amount of funds of the cashed out balance(s) of funds to one or more accounts associated with the user. In another such embodiment, the issued ticket voucher is redeemable at another (or the same) game presentation device to establish, via operation with the balance management server, another dedicated balance of funds for wagering at that game presentation device. In certain such embodiments, rather than issuing any ticket vouchers, the game presentation device operates with the balance management server and one or more servers to transfer the amount of funds of the cashed out balance(s) of funds to one or more accounts associated with the user.

It should be appreciated that in certain embodiments, since the system employs different balances associated with different funding sources (e.g., one balance of funds represents an amount committed to be used for purchasing plays of games and another balance of funds represents funds displayed as won at the game presentation device from purchased plays of game), the system enables certain balances of funds to be directly provided to a user while other balances of funds may not be directed provided to the user. For example, the system enables the user to be provided the balance of funds displayed as won at a game presentation device without enabling the user to be provided the dedicated balance of funds purchased from the point-of-sale terminal to be wagered at the game presentation device. In this example, once the dedicated balance of funds is played through, any wins resulting from such plays of such games becomes part of the balance of funds providable to the user.

It should be further appreciated that the system of the present disclosure utilizes different components associated with different functions to provide plays of games that employ predetermined game outcomes, such as pull-tab games, in a manner that is both preferable for certain users (in terms of the presentation of such games) and compliant with certain regulatory requirements (in terms of transacting funds associated with such games). Accordingly, in different embodiments, the financial transactions associated with procuring an amount to be wagered (via the subsequent, game presentation device enabled purchase of predetermined game outcomes) and redeeming any amounts won from the purchased predetermined game outcomes occur at one or more point-of-sale terminals. In other words, while the presentation of a predetermined game outcome from a cloud-based CDS server selected game outcome seed occurs at a game presentation device, in accordance with various jurisdictional regulations, the financial aspects of playing games associated with predetermined game outcomes (e.g., the financial aspects of purchasing certain lottery tickets) is handled via the point-of-sale terminal. Such a configuration provides that certain non-gaming establishments, such as retailers, located in jurisdictions where pull-tab games and/or instant ticket lottery games (such as with physical or virtual scratch-off-coatings ("SOCs")) are permitted (but where probability-based gaming is prohibited) sell balances to be used to play pull-tab games and/or instant ticket lottery games (through a point-of-sale terminal associated with that establishment), while the user's experience in the presentation of such games more closely tracks that of a probability-based gaming environment (through the interaction with the game presentation device).

More specifically, since certain users prefer to interact with probability-based electronic gaming machines that randomly determine, based on probability data, a game outcome (i.e., Class III gaming), and since certain jurisdictions prohibit the use of such probability-based electronic gaming machines, the configuration of the present disclosure provides a non-probability-based game outcome that a user experiences via a game presentation device in a setting similar to interacting with a probability-based electronic gaming machine. In other words, despite certain user's preferences to engage in probability-based gaming, in view of the uncertainty of game outcomes of probability-based electronic gaming machines being randomly determined upon a probability calculation such that user may, theoretically, never obtain any particular award, regulatory bodies in certain jurisdictions do not permit the use of probability-based electronic gaming machines in-part for these reasons. These regulatory bodies however permit the use of non-probability-based devices that are guaranteed to provide certain or definite awards, so that, for example, a certain number of wins is guaranteed and the overall amount paid back to users is guaranteed (i.e. the payback percentage of such gaming machines, when cycled through a predetermined quantity of games played, is a static percentage (and not any average expected percentage)).

Against this backdrop of certain users preferring to interact with probability-based electronic gaming machines, certain jurisdictions only permitting the use of non-probability-based devices and certain jurisdictions only permitting lottery games to be sold at designated locations (e.g., retail locations such as convenience stores, and grocery stores), the system of the present disclosure employs different components to enable these locations to offer predetermined game outcomes selected from a cloud-based CDS server and displayed (or otherwise presented) via a game presentation device operating with a remote game server and a balance management server. Put differently, by allocating certain tasks (e.g., procuring an amount to be wagered via the subsequent purchase of predetermined game outcomes and redeeming any amounts won from the purchased predetermined game outcomes) to a point-of-sale terminal associated with a specific designated location, allocating other tasks (e.g., selecting game outcome seeds from a maintained pool of game outcomes seeds) to a cloud-based CDS server associated with multiple designated locations, and allocating other tasks (e.g., presenting predetermined game outcomes determined from the selected game outcome seeds) to a game presentation device associated with the specific designated location and operating with a remote game server and a balance management server, the system of the present disclosure operates within the confines of certain jurisdictional regulations while interacting with users akin to how users interact with probability-based electronic gaming machines (e.g., Class III gaming machines). Such a configuration thus provides that certain non-gaming establishment locations, such as certain retailers, located in jurisdictions where pull-tab games and/or instant ticket lottery games are permitted (but where probability-based gaming is prohibited) sell and redeem pull-tab games and/or instant ticket lottery games (through a point-of-sale terminal associated with the retailer), while the user's experience in playing such purchased games tracks that of a user's experience playing games in a probability-based gaming environment, such as a casino.

It should be appreciated that while described as the cloud-based CDS server and the remote game server being separate components, in certain embodiments, the cloud-based CDS server and the remote game server are the same component. In these embodiments, a server operates as the cloud-based CDS server (in, amongst other functions, the maintenance of game outcome seed sets and the selected of game outcome seeds) and further operates as the remote game server (in, amongst other functions, the determination of a predetermined game outcome from a selected game outcome seed and the causing the game presentation device to display a play of a game which delivers the predetermined game outcome). It should be further appreciated that while described as the balance management server and the remote game server being separate components, in certain embodiments, the balance management server and the remote game server are the same component. In these embodiments, a server operates as the balance management server (in, amongst other functions, maintaining one or more balances of funds associated with a gaming session and authorizing the plays of games based on the amounts of balances) and further operates as the remote game server (in, amongst other functions, the determination of a predetermined game outcome from a selected game outcome seed and the causing the game presentation device to display a play of a game which delivers the predetermined game outcome).

While certain embodiments of the present disclosure are directed to utilizing a game outcome seed to determine one or more predetermined game outcomes of one or more plays of a primary game, such as a wagering game, it should be appreciated that such embodiments may additionally or alternatively be employed in association with utilizing a game outcome seed to determine one or more predetermined game outcomes of one or more play of a secondary game, such as a bonus game. Moreover, while certain embodiments of the present disclosure are directed to utilizing a game outcome seed to determine one or more predetermined game outcomes of one or more plays of a slot game employing a plurality of reels, it should be appreciated that such embodiments may additionally or alternatively be employed in association with utilizing a game outcome seed to determine one or more predetermined game outcomes of one or more plays of a non-slot game, such as, but not limited to, a card game (including, but not limited to, a poker game, a blackjack game, and/or a baccarat game), a keno game, and/or a bingo game. Furthermore, it should be appreciated that the game presentation device ("GPD") utilized to display plays of games with predetermined game outcomes may be any personal gaming device, such as desktop computers, laptop computers, tablet computers or computing devices, personal digital assistants, and/or mobile phones, provided by the location associated with the point-of-sale terminal or otherwise provided by the user.

In certain embodiments, the system enables a user to remain anonymous without identifying themselves to any of the components of the system. In these embodiments, to obtain a gameplay ticket voucher associated with an amount of funds usable to purchase plays of games with predetermined game outcomes, the point-of-sale terminal ("POS terminal") enables the user to deposit an amount of dedicated funds to be used to procure a gameplay ticket voucher. That is, the system enables an amount of funds deposited in a POS terminal to be convertible to one or more gameplay ticket vouchers. In one such embodiment, the system enables a user that has an amount of cash (or other forms of payment) to utilize a POS terminal to procure one or more gameplay ticket vouchers via the user depositing the amount of cash into the POS terminal to create a balance of the POS terminal usable to purchase a gameplay ticket voucher. In another such embodiment, the system enables a user that has one or more cashless ticket vouchers (e.g., an anonymous bearer instrument issued by a cashless system and associated with an amount of funds and redeemable for cash via a kiosk or a cashier and/or, in certain instances, redeemable for game play on a GPD) to utilize a POS terminal to procure one or more gameplay ticket vouchers via the user depositing (or scanning with a scanner of the POS terminal) the cashless ticket voucher into the POS terminal to create a balance of the POS terminal usable to purchase a gameplay ticket voucher.

In certain embodiments, while a user may remain anonymous without identifying themselves to any of the components of the system, the system enables the user to identify themselves to receive the benefit of one or more patron management systems, such as the benefits associated with a loyalty program. In certain embodiments, to comply with certain jurisdictional requirements and/or operator policies, the system requires the user to identify themselves to one or more of the components of the system. In these embodiments, the system may (or may not) avail the user to receiving the benefit of one or more patron management systems, such as the benefits associated with a loyalty program.

In certain embodiments in which the user identifies themselves to the POS terminal, the POS terminal enables the user to identify themselves via the user presenting a user identifier at the POS terminal. In certain such embodiments, the user identifier includes a physical card associated with an account maintained for the user. In certain other embodiments, the user identifier additionally or alternatively includes a mobile device running a mobile device application associated with an account maintained for the user. In certain other embodiments, the user identifier additionally or alternatively includes a mobile device running a mobile device application associated with an identity of the user independent of any account associated with the user.

In certain embodiments, the user identifier presented to the POS terminal operates to identify the user for compliance reasons and/or loyalty program benefit accrual reasons. In certain embodiments, the user identifier presented to the POS terminal additionally or alternatively operates to facilitate a transfer of funds from one or more accounts associated with the user to one or more accounts associated with the POS terminal. In these embodiments, one or more components of the system of the present disclosure operate with a fund management system including various sub-systems that are each associated with or otherwise maintain one or more electronic or virtual accounts. In these embodiments, the various accounts maintained for a user collectively form an enterprise account (i.e., a fund management account) for the user. That is, the collection of lottery game purchasing accounts (e.g. lottery wagering wallets), cashless wagering accounts (e.g. cashless wagering wallets, cashless sports wagering wallets and/or cashless mobile wagering wallets) and retail accounts (e.g., retail wallets) associated with or otherwise maintained for a user collectively form an enterprise account (i.e., an integrated fund management wallet) that the user may access to transfer funds and/or view balance information amongst the various accounts associated with or otherwise maintained for the user.

In various embodiments, the fund management system includes or is otherwise associated with one or more lottery game purchasing systems. Each lottery game purchasing system is associated with or otherwise maintain one or more lottery game purchasing accounts for one or more users. In certain embodiments, a user of a POS terminal utilizes a mobile device application running on a mobile device and/or a physical instrument (e.g., a smart card or a user issued magnetic striped card that the user utilizes via inserting the card into a card reader associated with the POS terminal) to facilitate the electronic transfer of any funds between the lottery game purchasing account associated with that user and the POS terminal.

In various embodiments, the fund management system includes or is otherwise associated with one or more cashless wagering systems. Each cashless wagering system is associated with or otherwise maintain one or more cashless wagering accounts. In certain embodiments, a user of a POS terminal utilizes a mobile device application running on a mobile device and/or a physical instrument (e.g., a smart card or a user issued magnetic striped card that the user utilizes via inserting the card into a card reader associated with the POS terminal) to facilitate the electronic transfer of any funds between the cashless wagering account associated with that user and the POS terminal. In certain such embodiments, the cashless wagering account associated with a user operates as a lottery game purchasing account associated with that user to enable the purchase of a gameplay ticket voucher at a POS terminal.

In various embodiments, the fund management system additionally or alternatively includes or is otherwise associated with one or more retail wallet systems that each maintain one or more retail accounts associated with one or more users. In certain embodiments, such a retail account (e.g., a retail wallet) of a retail wallet system operates with the POS terminal in the designated location authorized to sell plays of games with predetermined game outcomes to enable users to purchase a balance of funds to be used for such plays of the game via the user's retail account. In certain embodiments, the fund management system does not maintain a separate retail account, but rather utilizes the retail wallet system as a transaction coordinator to account for any transactions to purchase a balance of funds to be used for plays of games with predetermined game outcomes. In certain such embodiments, the retail account associated with a user operates as the lottery game purchasing account associated with that user to enable the purchase of a gameplay ticket voucher at a POS terminal.

In certain embodiments, the retail account is a retail account associated with a user having a balance or a pre-paid access account which, per current regulations from the U.S. Treasury Department Financial Crimes Enforcement Network ("FinCEN"), cannot be convertible to cash and can only be used for the purchase of a balance of funds to be used for plays of games with predetermined game outcomes. In these embodiments, such an account operates with a POS terminal to enable users to purchase a balance of funds to be used for plays of games with predetermined game outcomes via the user's account. Accordingly, in certain embodiments, based on one or more jurisdictional regulations, an amount of funds deposited in a retail account (and/or a user's lottery game purchasing account) may be used with various POS terminals to enable users to purchase a balance of funds to be used for plays of games with predetermined game outcomes, but such funds deposited in the account cannot be converted to cash or check. In certain other embodiments, based on one or more different jurisdictional regulations, an amount of funds deposited in a retail account (and/or a user's lottery game purchasing account) may be used with various POS terminals to enable users to purchase a balance of funds to be used for plays of games with predetermined game outcomes wherein such funds deposited in the account may be converted to or otherwise redeemable for cash or check.

In certain embodiments, the fund management system is in communication with one or more external funding sources that maintain one or more external accounts for the user. For example, the fund management system that maintains or is otherwise associated with one or more accounts drawn from to purchase a balance of funds to be used for plays of games with predetermined game outcomes is in communication with an external funding system that is in communication with a network of one or more banks or other financial institutions that operate to electronically transfer funds between the user's accounts maintained at such banks or financial institutions and one or more of the accounts maintained by the fund management system. In certain embodiments, such external accounts include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts).

In certain embodiments, the fund management system is in communication with one or more credit systems that each issue the user one or more lines of credit. In certain such embodiments, these lines of credit are accessible to facilitate a transfer of funds directly between the line of credit issued by the credit system and a balance of a POS terminal. In certain other embodiments, these lines of credit are accessible to facilitate a transfer of funds between the line of credit issued by the credit system and an account drawn from to purchase a balance of funds to be used for plays of games with predetermined game outcomes and further between such an account and a balance of a POS terminal.

In certain embodiments, the fund management system is also in communication with one or more credit reporting/credit risk systems that monitor and report on various accounts associated with the user. For example, the fund management system that maintains one or more accounts drawn from to purchase a balance of funds to be used for plays of games with predetermined game outcomes is in communication with one or more credit reporting and risk systems. These credit reporting and risk systems monitor and report on a credit rating and status of one or more accounts maintained for the user at various funding sources, such as various financial institutions. In certain embodiments, the fund management system is in communication with one or more patron management systems that monitor activities at various points of contact and provide rewards, such as redeemable player tracking points, in association with such activities.

In various embodiments, prior to identifying an account to the POS terminal, a user must first open and fund an account. In these embodiments, utilizing an interface, such as a mobile device application being executed by a mobile device, a website accessed from a browser, an interface of a POS terminal, an externally controlled service window displayed by the POS terminal, an interface of a GPD, and/or an externally controlled service window displayed by the GPD the user attempts to open one or more accounts through one or more interactive forms. For example, as part of opening a retail account, a user (whom has already logged into one or more fund management system accounts via a mobile device application) makes one or more inputs via an interface to provide certain user identifying information, such as, but not limited to, additional address details, a social security number and/or a mother's maiden name, and/or certain anticipated spending information, such as how the user intends to spend the funds withdrawn from such an account if opened. In certain embodiments, when opening the account, the user (and/or an operator) imposes certain use limitations on drawing funds from the account to purchase a balance of funds at the POS terminal, such as a total balance of funds that can be purchased from the account in a certain period of time.

In one such embodiment, in association with the opening of the account, the user is provided a physical instrument associated with the account. In another such embodiment, the user is provided a code to activate their account and/or download a mobile identification (e.g., a mobile pass representing the account) via logging into a mobile device application or logging into a website. In another such embodiment, the user is sent a short message service ("SMS") text and/or e-mail informing the user how to activate their account and/or download a mobile identification via logging into a mobile device application or logging into a website. In certain embodiments, the system enables a user to enroll or otherwise sign up for such accounts via other avenues, such as via picking up an account card at various locations, via a mobile application running on a mobile device, via the POS terminal, via a kiosk and/or via adding an account to an existing patron account, such as linking an account to an existing patron tracking account. In another embodiment, the system automatically creates an account, such as a lottery game purchasing account, for a user who is otherwise associated with another account, such as a cashless wagering account. In certain embodiments, following the opening of an account and/or linking to an existing account and following any required acknowledgement by the user of any required terms and conditions associated with using such an account to purchase a balance of funds to be used for plays of games with predetermined game outcomes, the fund management system notifies the user, if applicable, regarding the different funding options provided by the fund management system. For example, the fund management system notifies the user, via one or more of a message displayed by the POS terminal, an email, a SMS text message, and/or a notification displayed by a mobile device application.

In certain embodiments wherein a transfer of funds to a POS terminal occurs in association with the user presenting a physical card associated with an account to the POS terminal, following the presentation, the POS terminal displays one or more interfaces that enable the user to input an amount of funds to be transferred from one or more accounts to an account associated with the POS terminal to purchase a gameplay ticket voucher associated with a balance of funds. In certain embodiments, wherein a transfer of funds to a POS terminal occurs in association with a mobile device application being executed by a mobile device, after a user has opened an application on a mobile device and inputted an amount of funds to be transferred from one or more accounts to an account associated with the POS terminal to purchase a gameplay ticket voucher associated with a balance of funds, the mobile device communicates data associated with the transfer of funds to the POS terminal. For example, when a purchase is attempted to be made with funds from an account using a mobile device application at a POS terminal, the mobile device application prompts the user to cause the mobile device to engage the POS terminal, such as prompting the user to tap the mobile device to a designated portion of the POS terminal (or otherwise moving the mobile device to within a designated distance of a designated location of the POS terminal). Such engagement initiates a pairing or linkage between the mobile device and the POS terminal (or a component of a fund management system located inside the POS terminal (i.e., a component of the POS terminal)), wherein the pairing or linkage between the mobile device and the POS terminal occurs via one or more applications being run or executed on the mobile device. In this example, after such engagement, the mobile device application communicates, via a wireless communication protocol (including, but not limited to: Bluetooth™, Bluetooth™ Low Energy ("BLE"), one or more cellular communication standards (e.g., 3G, 4G, 5G, 6G, LTE), one or more Wi-Fi compatible standards, and one or more short range communication protocols (e.g., a near field communication ("NFC") protocol), data to the POS terminal to facilitate the potential purchase of a balance of funds to be used for plays of games with predetermined game outcomes. It should be appreciated that in certain embodiments, the mobile device application utilized is a location based digital wallet enabled application, such as a Passbook-enabled or Wallet-enabled application, which is accessible when the user enters the designated location of the POS terminal.

It should be appreciated that in different embodiments, in addition to or alternatively from utilizing a mobile device running a mobile device application to, amongst other actions, access funds to be transferred to a POS terminal to procure a balance usable to play games employing predetermined game outcomes, the system utilizes a kiosk, a gaming device (e.g., an interface of a GPD), an externally-controlled service window displayed by a kiosk or a gaming device, a component of a patron management system, such as a player tracking unit, the POS terminal, and/or a vendor interface, to, amongst other actions, access funds to be transferred to a POS terminal to procure a balance usable to play games employing predetermined game outcomes.

In various embodiments, to facilitate the transfer of funds from an account associated with the user to an account associated with the POS terminal to purchase a dedicated balance of funds to be used for plays of games with predetermined game outcomes, the system determines whether or not to complete the attempted purchase. In these embodiments, upon receiving data or information regarding an identified account that funds are to be transferred from and the amount of the attempted transfer, the POS terminal (and/or a server associated with the POS terminal) interfaces with, such as via one or more application programming interfaces, the fund management system to determine if the identified account has adequate funds for the intended transfer. Upon receiving the request of the determined amount of funds and logging the user into an account associated with the user (if necessary), a component of the fund management system determines whether to authorize the transfer of the determined amount of funds. In these embodiments, the component of the component of the fund management system (e.g., one or more servers of the fund management system) determines whether the account includes an amount of funds at least equal to the requested amount of funds to complete the transaction.

If the component of the fund management system confirms the presence of adequate funds in the identified account, the component of the fund management system authorizes the transfer. The component of the fund management system then proceeds to transfer an amount of funds to cover the purchased balance of funds to be used for plays of games with predetermined game outcomes from the account to an account associated with the POS terminal to complete the purchase. In these embodiments, if the component of the fund management system determines to authorize the determined amount of funds because the amount of funds in the account at least equals the requested amount of funds to complete the transaction, the component of the fund management system updates the account associated with the user (to reflect the transfer out of the requested amount of funds) and communicates an authorization to the POS terminal. Such a transfer of funds to complete the purchase is associated with a transaction identification that one or more components of the system store for reporting purposes.

On the other hand, if the component of the fund management system indicates that the account lacks adequate funds for the attempted transaction, the component of the fund management system denies the transaction because the account lacks adequate funds. In other words, if an account is not associated with enough of a balance to fund an attempted transaction, the fund management system denies the transaction using the account. In these embodiments, the POS terminal (and/or another interface) displays one or more transfer denial messages and, in certain embodiments, prompts the user to attempt to transfer a different amount of funds from one or more accounts to an account associated with the POS terminal.

Figure 1B:
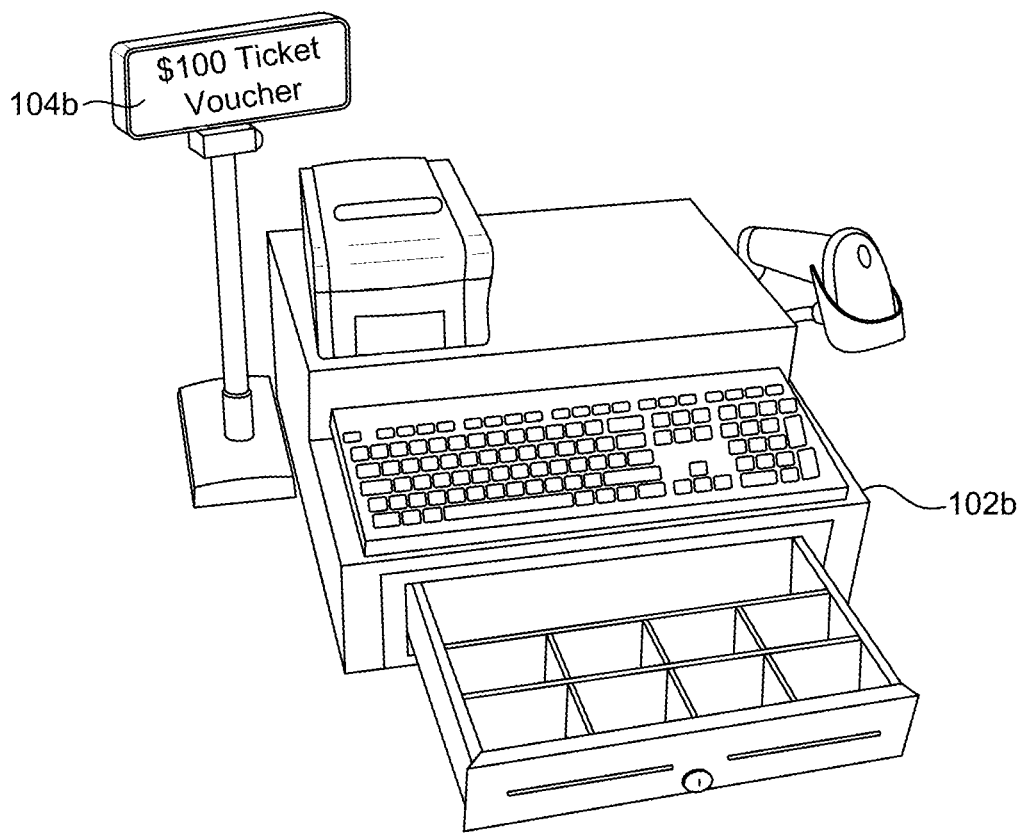
FIG. 1B is a perspective view of an example embodiment of another point-of-sale terminal of the present disclosure.

In various embodiments, following the deposit and/or transfer of an amount of funds to the POS terminal, the system enables an amount of funds deposited in and/or transferred to the account associated with the POS terminal to be converted to one or more gameplay ticket vouchers. In these embodiments, the system enables a user to utilize a POS terminal to convert an amount of a balance of the POS terminal to a gameplay ticket voucher associated with an amount of funds. In certain embodiments, following establishing a balance of the POS terminal, the POS terminal enables a user to make one or more inputs associated with obtaining a gameplay ticket voucher. For example, as seen in FIG. 1A, upon a self-service POS terminal 102a receiving an amount of funds, the self-service POS terminal causes a notification 104a to be displayed that informs the user that they may exchange the amount of funds for a gameplay ticket voucher usable at a GPD to play one or more lottery games that employ predetermined game outcomes. In another example, as seen in FIG. 1B, following a purchase transaction at a POS terminal 102b operated by personnel at a vendor that offers plays of lottery games with predetermined game outcomes, a display device 104b of the POS terminal 102b displays a notification regarding the purchase of a $100 gameplay ticket voucher.

In certain embodiments, following the user making one or more inputs to procure a gameplay ticket voucher from the POS terminal, the POS terminal (and/or a server associated with the POS terminal) determines whether to authorize the purchase of a gameplay ticket voucher associated with an amount of funds in exchange for the amount of funds of the balance of the POS terminal. If the POS terminal (and/or a server associated with the POS terminal) determines not to authorize the exchange of an amount of funds of the balance of the POS terminal for a gameplay ticket voucher, the POS terminal communicates a denial to the user and does not cause any gameplay ticket vouchers to be issued. On the other hand, if the POS terminal (and/or the sever associated with the POS terminal) determines to authorize the exchange of an amount of funds of the balance of the POS terminal for a gameplay ticket voucher, the POS terminal: (i) retains the amount of funds, (ii) updates the credit balance of the POS terminal to reflect the exchange of an amount of funds for a gameplay ticket voucher, and (iii) issues a gameplay ticket voucher for an amount of funds usable for one or more plays of one or more games employing predetermined game outcomes. In certain embodiments, when issued, the gameplay ticket voucher is not associated with any particular games to be played nor any particular predetermined game outcomes purchased. In these embodiments, when issued, the gameplay ticket voucher is associated with a balance of non-monetary funds committed to be used to purchase predetermined game outcomes for one or more subsequently identified games to be played at one or more subsequently identified wager amounts. In such embodiments, based on the results of the subsequent plays of the games with predetermined game outcomes, such a balance of non-monetary funds may be converted to an amount of monetary funds.

Figure 2A:
FIGS. 2A and 2B are examples of different gameplay ticket vouchers available to be purchased at a point-of-sale terminal and redeemable at a game presentation device for one or more plays of one or more games using predetermined game outcomes.
Figure 2B:

It should be appreciated that since a created gameplay ticket voucher may take multiple forms, the system includes multiple ways to convey such a created gameplay ticket voucher to the user. In one embodiment wherein the created gameplay ticket voucher takes the form of a physical gameplay ticket voucher, the POS terminal causes a printer to print the created gameplay ticket voucher. For example, as seen in FIG. 2A, the POS terminal prints a physical gameplay ticket voucher 202a associated with $100 usable for one or more plays of one or more lottery games employing predetermined game outcomes. In another embodiment wherein the created gameplay ticket voucher takes the form of a virtual gameplay ticket voucher, the POS terminal communicates data to a device associated with the user, such as a mobile device running an application, to transfer the created virtual gameplay ticket voucher to the user. For example, as seen in FIG. 2B, the POS terminal creates a virtual gameplay ticket voucher 202b associated with $100 usable for one or more plays of one or more lottery games employing predetermined game outcomes and transfers data associated with the virtual gameplay ticket voucher to a mobile device 204 that operates to display one or more images associated with the obtained virtual gameplay ticket voucher. In certain embodiments, if the GPD comprises a mobile device, the GPD stores the created virtual gameplay ticket voucher prior to a redemption of the virtual gameplay ticket voucher.

In certain embodiments, in association with a POS terminal issuing a gameplay ticket voucher, the POS terminal (and/or a server associated with the POS terminal) stores a record of the gameplay ticket voucher. Such a record of the gameplay ticket voucher includes, for each gameplay ticket voucher, gameplay ticket voucher identification information stored in one or more gameplay ticket voucher databases and including, but not limited to, one or more of: (i) a gameplay ticket voucher vendor name; (ii) a gameplay ticket voucher vendor address; (iii) a gameplay ticket voucher title (e.g., "lottery gameplay ticket voucher"); (iv) a gameplay ticket voucher validation number (e.g., an eighteen digit number or code of the issued gameplay ticket voucher displayed on the gameplay ticket voucher); (v) a gameplay ticket voucher validation number machine-readable code (e.g., a bar code and/or a QR code that contains an encoded gameplay ticket voucher validation number; (vi) a ticket date/time (i.e., a date/time when the gameplay ticket voucher was issued); (vii) a ticket number (e.g., a sequential number displayed on the gameplay ticket voucher); (viii) an amount (i.e., an amount of the gameplay ticket voucher as a numerical value); (ix) an amount in words (i.e., the amount of the issued gameplay ticket voucher in words); (x) any expiration (i.e., an expiration date of the gameplay ticket voucher; (xi) a device identification (i.e., an asset or machine number of the POS terminal that issued the gameplay ticket voucher); (xii) font or formatting information associated with the gameplay ticket voucher, (xiii) an image of the gameplay ticket voucher (e.g., an image of a front of the gameplay ticket voucher and/or an image of a back of the gameplay ticket voucher), (xiv) a primary key (i.e., an index for the record in the table), (xv) a ticket state (e.g., a state of a ticket as being in a redeemed state, an unredeemed state or a suspect state), (xvi) a redemption date (i.e., the date the gameplay ticket voucher was redeemed at (if the gameplay ticket voucher is in the redeemed state), (xvii) redeemed at (i.e., the device where the gameplay ticket voucher was redeemed (if the gameplay ticket voucher is in the redeemed state), (xviii) a data signature (i.e., a signature of the data associated with the gameplay ticket voucher to prevent tampering); and/or (xix) compliance with any associated redemption limits or controls.

It should be appreciated that following the acceptance of funds and the creation of one or more gameplay ticket vouchers, the POS terminal (and/or a server associated with the POS terminal) stores information associated with the funds received and gameplay ticket voucher issued. In these embodiments, since the POS terminal handles the monetary transactions associated with the system of the present disclosure, the POS terminal (and/or a server associated with the POS terminal) operates with various reporting systems, such as an accounting system, to report such monetary transactions. In certain embodiments, the POS terminal (and/or a server associated with the POS terminal) communicates certain data (e.g., data associated with gameplay ticket vouchers purchased and/or wins reported from the remote game server, the balance management server and/or cloud-based CDS server) in real-time and communicates certain other data (e.g., data associated with non-monetary transactions occurring at any component of the system) at periodic intervals. In certain embodiments, the POS terminal (and/or a server associated with the POS terminal) communicates certain data as that data is individually generated and communicates certain data as part of a batch reporting of data. In these embodiments, the reporting system consolidates data from one or more POS terminals for certain regulatory purposes, such as to determine any amounts of taxes owed on the transactions occurring at the POS terminal. In certain embodiments, the POS terminal (and/or a server associated with the POS terminal) additionally or alternatively operates with various patron benefit systems, such as a player tracking system, to report such monetary transactions. In these embodiments, the patron benefit system utilizes data from one or more POS terminals to determine any benefit, such as a quantity of loyalty points, earned by an identified user in association with the transactions occurring at the POS terminal.

In certain embodiments, once funds are used to procure a gameplay ticket voucher, the amount of funds of the gameplay ticket voucher cannot be returned to the user and are thus considered dedicated funds. That is, such funds associated with a gameplay ticket voucher cannot be directly cashed out and are not directly redeemable for cash (and/or a transfer of funds to an account associated with the user). Rather, such funds must be used for game play (or other gaming function) at a GPD, wherein the results of such game play is in a form of funds that may then be cashed out to a winnings ticket voucher redeemable for cash (and/or a transfer of funds to an account associated with the user). In certain other embodiments, even after funds are used to procure a gameplay ticket voucher, the amount of funds of the gameplay ticket voucher can be returned to the user by cashing out the purchased gameplay ticket voucher for cash (and/or transferring the amount of funds associated with the gameplay ticket voucher to an account associated with the user) at a POS terminal and/or a GPD operating with the balance management server and/or one or more fund management system servers.

In certain embodiments, following the procurement of a gameplay ticket voucher, the obtained gameplay ticket voucher is usable at a GPD in association with a gaming session. In these embodiments, following receipt of a gameplay ticket voucher associated with an amount of funds, that amount of funds establishes a credit balance maintained by the balance management server and displayed by the GPD. In certain embodiments, in addition to or alternative from establishing a credit balance maintained by the balance management server and displayed by the GPD responsive to a receipt of a gameplay ticket voucher, the GPD directly receives an amount of funds and establishes a credit balance maintained by the balance management server and displayed by the GDP responsive to such funds. In these embodiments, the GPD operates with the balance management server to receive an amount of funds via a cash deposit of funds (if the GPD is equipped to receive cash), a cashless ticket voucher deposit of funds (if the GPD is equipped to receive a cashless ticket voucher) and/or a transfer of funds from one or more accounts as described above in relation to establishing a balance of funds of the POS terminal. It should thus be appreciated that while generally described as the POS terminal, the GPD and the balance management server performing separate functions, in certain embodiments, the GPD and balance management server collectively operate as the POS terminal for the procurement of a gameplay ticket voucher and/or the redemption of a gameplay ticket voucher.

In various embodiments, following a user obtaining one or more gameplay ticket vouchers, a GPD enables a user to attempt to redeem such gameplay ticket vouchers in exchange for an increase, based on the amount of funds associated with that gameplay ticket voucher, of a balance maintained by the balance management server and displayed by the GPD. In certain embodiments where the gameplay ticket voucher takes the form of a physical gameplay ticket voucher and that physical gameplay ticket voucher is attempted to be redeemed at a GPD, responsive to a user inserting a gameplay ticket voucher into a slot, such as a bezel, of an acceptor of the GPD (or scanning one or more machine-readable codes (e.g., a bar code and/or a QR code) of the gameplay ticket voucher with a scanner of the GPD), the GPD communicates data associated with the received gameplay ticket voucher to the balance management server (or to the remote game server which communicates such data to the balance management server). In these embodiments, the balance management server operates with the POS terminal (and/or a server associated with the POS terminal) to identify the gameplay ticket voucher attempted to be redeemed and attempts to validate the received gameplay ticket voucher. In certain embodiments where the gameplay ticket voucher takes the form of a physical gameplay ticket voucher and that physical gameplay ticket voucher is attempted to be redeemed at a GPD, responsive to a user inserting a gameplay ticket voucher into a slot, such as a bezel, of an acceptor of the GPD (or scanning one or more machine-readable codes (e.g., a bar code and/or a QR code) of the physical gameplay ticket voucher with a scanner of the GPD), the GPD communicates data associated with the received gameplay ticket voucher to the remote game server (or to the balance management server which communicates such data to the remote game server). In these embodiments, the remote game server operates with the POS terminal (and/or a server associated with the POS terminal) to identify the gameplay ticket voucher attempted to be redeemed and attempts to validate the received gameplay ticket voucher. In certain embodiments where the gameplay ticket voucher takes the form of a virtual gameplay ticket voucher, following the user scanning, with a scanner of the GP, one or more machine-readable codes (e.g., a bar code and/or a QR code) displayed by the device storing the virtual gameplay ticket voucher or following the user selecting, via an interface of a device storing the virtual gameplay ticket voucher, a virtual gameplay ticket voucher to redeem, the device communicates with the POS terminal (and/or a server associated with the POS terminal) to identify the gameplay ticket voucher attempted to be redeemed in association with the GDP and the POS terminal (and/or a server associated with the POS terminal) attempts to validate the received gameplay ticket voucher.

In certain embodiments, upon the POS terminal (and/or a server associated with the POS terminal) identifying the gameplay ticket voucher attempted to be redeemed, the POS terminal (and/or a server associated with the POS terminal) attempts to validate the received gameplay ticket voucher. In certain embodiments, such an attempted validation of the received gameplay ticket voucher includes determining if any redemption limits or controls are associated with the gameplay ticket voucher that prevent the validation of the gameplay ticket voucher in association with the requested transaction. In one such embodiment, a redemption control pertains to the type of device that may or may not redeem the gameplay ticket voucher. In another such embodiment, a redemption control additionally or alternatively pertains to the location where a gameplay ticket voucher may or may not be redeemed at. In another such embodiment, a redemption control additionally or alternatively pertains to a value of the gameplay ticket voucher that may or may not be redeemed using a particular type of device and/or at a particular location. In another such embodiment, a redemption control additionally or alternatively pertains to an age of the gameplay ticket voucher that may or may not be redeemed using a particular type of device and/or at a particular location. In another such embodiment, a redemption control additionally or alternatively pertains to an identity of a holder of the gameplay ticket voucher (if known) that may or may not be redeemed using a particular type of device and/or at a particular location.

If the POS terminal (and/or a server associated with the POS terminal) determines, at least partially based on any applicable redemption controls, not to validate the received gameplay ticket voucher, the POS terminal (and/or a server associated with the POS terminal) communicates, to the balance management server data associated with the rejected redemption of the gameplay ticket voucher. In these embodiments, the balance management server instructs the GPD to return, if applicable, the gameplay ticket voucher to the user of the GPD and display zero, one or more messages regarding the rejection of the received gameplay ticket voucher. In certain embodiments, such messages regarding the rejection of the received gameplay ticket voucher are provided to the holder of the gameplay ticket voucher via any suitable notification mechanism including, but not limited to, the GPD, a remote host controlled service window displayed by the GPD, a mobile device running a mobile device application, via an email, and/or via a SMS text message.

On the other hand, if the POS terminal (and/or a server associated with the POS terminal) determines, at least partially based on any applicable redemption controls, to validate the received gameplay ticket voucher, the POS terminal (and/or a server associated with the POS terminal) updates one or more gameplay ticket voucher databases to reflect the redemption of the received gameplay ticket voucher. In addition to updating any database to reflect the redemption of the gameplay ticket voucher, the POS terminal (and/or a server associated with the POS terminal) notifies the balance management server of the amount associated with the received gameplay ticket voucher. The balance management server updates one or more balances to reflect the amount associated with the received gameplay ticket voucher and communicates data to the GPD to display such updated balances.

In certain embodiments in which the user's identity is known and the balance management server maintains one or more accounts associated with the user, the balance management server updates such accounts to reflect the amount associated with the validated gameplay ticket voucher and communicates data to the GPD to display a balance of the account and/or a balance of funds associated with the received gameplay ticket voucher. In certain embodiments in which the user's identity is unknown (or the balance management server does not maintain any accounts associated with any uses), the receipt of a validated gameplay ticket voucher results in the balance management server associating one or more gameplay accounts with a gaming session and such updated balances and communicating data to the GPD to display a balance of such an associated gameplay account (which, if one gameplay ticket voucher is redeemed, corresponds to an amount of that gameplay ticket voucher).

In certain embodiments, in addition to or alternative from employing gameplay ticket vouchers to transfer funds received at a POS terminal to one or more balances maintained by the balance management server and displayed by the GPD, the system enables a user to interface with the POS terminal to facilitate a transfer of funds from one or more accounts associated with the user to a system account accessible by the POS terminal and the balance management server. In these embodiments, similar to how funds are transferred to the POS terminal from one or more accounts associated with the user in association with the issuance of a gameplay ticket voucher, funds are transferred to an account associated with the POS terminal from one or more accounts associated with the user. Such funds are further associated with the user such that upon the user logging into a GPD (and/or the remote game server and/or the balance management server) and requesting access to such funds, the system transfers the funds from the account associated with the POS terminal to one or more balances maintained by the balance management server and displayed by the GPD.

In certain embodiments, the GPD displays a single balance maintained by the balance management server that increases based on amounts deposited, increases based on amounts won from plays of games employing predetermined game outcomes and decreases based on amounts used to purchase plays of games employing predetermined game outcomes. In certain embodiments, the GPD displays multiple balances maintained by the balance management server for different activities occurring at the GPD. In one such embodiment, the GPD displays a first balance (i.e., an amount to be wagered balance) maintained by the balance management server that increases based on amounts deposited and decreases based on amounts used to purchase plays of games employing predetermined game outcomes. In this embodiment, the GPD displays a second balance (i.e., an amount of winnings balance) maintained by the balance management server that increases based on amounts won from plays of games employing predetermined game outcomes. In certain embodiments, the system utilizes multiple balances maintained by the balance management server for different activities occurring at the GPD but displays to the user a single balance of the amount remaining to be wagered. In these embodiments, while the balance management server tracks a second balance that increases based on amounts won from plays of games employing predetermined game outcomes, the balance management server causes the GPD not to display the amount of this balance until the user terminates their gaming session.

In certain embodiments that utilizes multiple balances, the balance management server does not enable any transfer between balances. In these embodiments, once the amount to be wagered balance is depleted, assuming no additional funds are deposited onto the GPD to increase the balance maintained by the balance management server (such as via the receipt of another gameplay ticket voucher procured from a POS terminal), the gaming session terminates because the user cannot transfer funds from the amount in the winnings balance to the amount to be wagered balance. In certain embodiments that utilize multiple displayed balances, the balance management server enables the user to transfer funds from the second balance representative of amounts won from plays of game to the first balance representative of amounts to be wagered. In certain embodiments that utilize multiple balances, upon an occurrence of an inter-balance fund transfer event, such as a determination that the amount to be wagered balance is below a first threshold amount and/or the amount in the winnings balance is above a second threshold amount, the balance management server automatically transfers funds from the second balance representative of amounts won from plays of game to the first balance representative of amounts to be wagered. In certain embodiments, the balance management server utilizes one or more limits in the amount of funds that may be transferred from the second balance to the first balance.

Figure 3A:
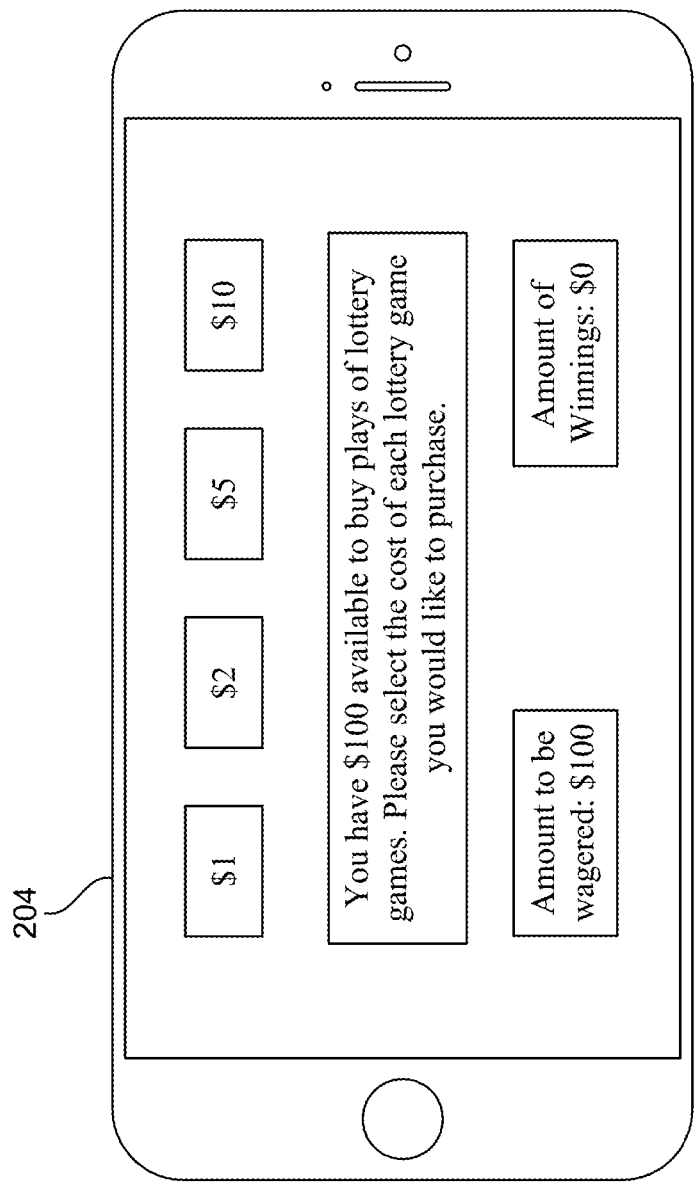
FIGS. 3A, 3B, 3C, and 3D are front views of one embodiment of a game presentation device illustrating the selection of and play of a game using a predetermined game outcome.
Figure 3B:
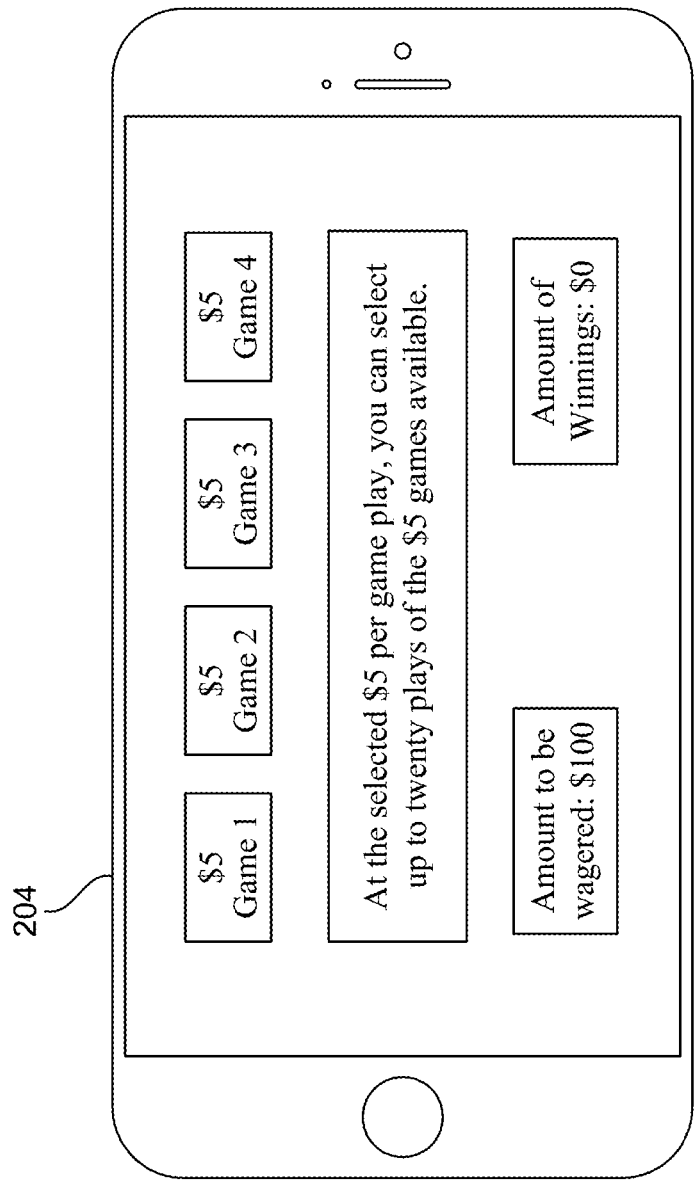

Following the updating of the balance maintained by the balance management server and displayed by the GPD to reflect the amount deposited that is available to be used to purchase plays of games with predetermined game outcomes, the GPD operates with the remote game server to enable the user to select a type of game to play as well as a quantity of plays of the selected game to play. That is, since different games, such as different pull-tab games, are associated with different costs, the remote game server enables a user to interface with the GPD to select which games to play at which price points as well as the quantity of games to play at that selected cost. In certain embodiments, the remote game server enables the user to interface with the GPD to select a cost per game played and then the remote game server enables the user to further interface with the GPD to select a game available at the selected cost. In these embodiments, the remote game server enables the user to individually and sequentially purchase each game to be played at a specific cost. In certain embodiments, the remote game server enables the user to interface with the GPD to select a cost per game played and then the remote game server enables the user to interface with the GPD to select one or more games available at the selected cost. In these embodiments, the remote game server enables the user to attempt to batch purchase games to be played at a specific cost. For example, as seen in FIG. 3A, if the lottery games offered by the remote game server are different lottery games associated with pull-tabs having different costs, following the user using the GPD to redeem the POS terminal procured gameplay ticket voucher worth $100, the remote game server enables the user to interface with the GPD to select if they would like to play games costing $1, $2, $5 or $10. In this example, as seen in FIG. 3B, following the user selecting that they would like to play games costing $5, the remote game server enables the user to interface with the GPD to cumulatively select up to twenty plays of one or more games costing $5 each. In certain other embodiments, the remote game server enables the user to interface with the GPD to select a package of one or more costs per game played and one or more games available at such costs wherein the package is defined, at least in part, based on the balance of the balance management server available to be allocated to plays of such games. In certain embodiments, in addition to factoring in the cost per play of a game in determining which games to offer to the user, in instances where the identity of the user is known, the system factors in user data, such as user preferences and/or user game play history, in determining which games to offer to the user.

Following the selection of one or more games to play at one or more costs per game play, upon an occurrence of a game triggering event (e.g., an attempted purchase of a lottery game at a specific price point), the GPD requests a play of the selected game at the selected cost from the remote game server. Upon receiving the request, the remote game server requests an authorization of the selected cost from the balance management server which maintains the balance of funds procured from the POS terminal. If the balance management server does not authorize the requested play of the game at the selected cost, the balance management server communicates a denial message to the remote game server which in turn communicates a denial message to be displayed by the GPD. For example, if the balance management server determines that the balance maintained by the balance management server lacks adequate funds to cover the play of the game at the selected cost, the balance management server denies the request to play the selected game at the selected cost. On the other hand, if the balance management server authorizes the requested play of the game at the selected cost, the balance management server reduces the balance of funds based on the selected cost and communicates an approval message to the remote game server. Upon receipt of the approval message from the remote game server, the remote game server communicates data to the GPD to display an initiation of the requested play of the game.

Figure 3C:
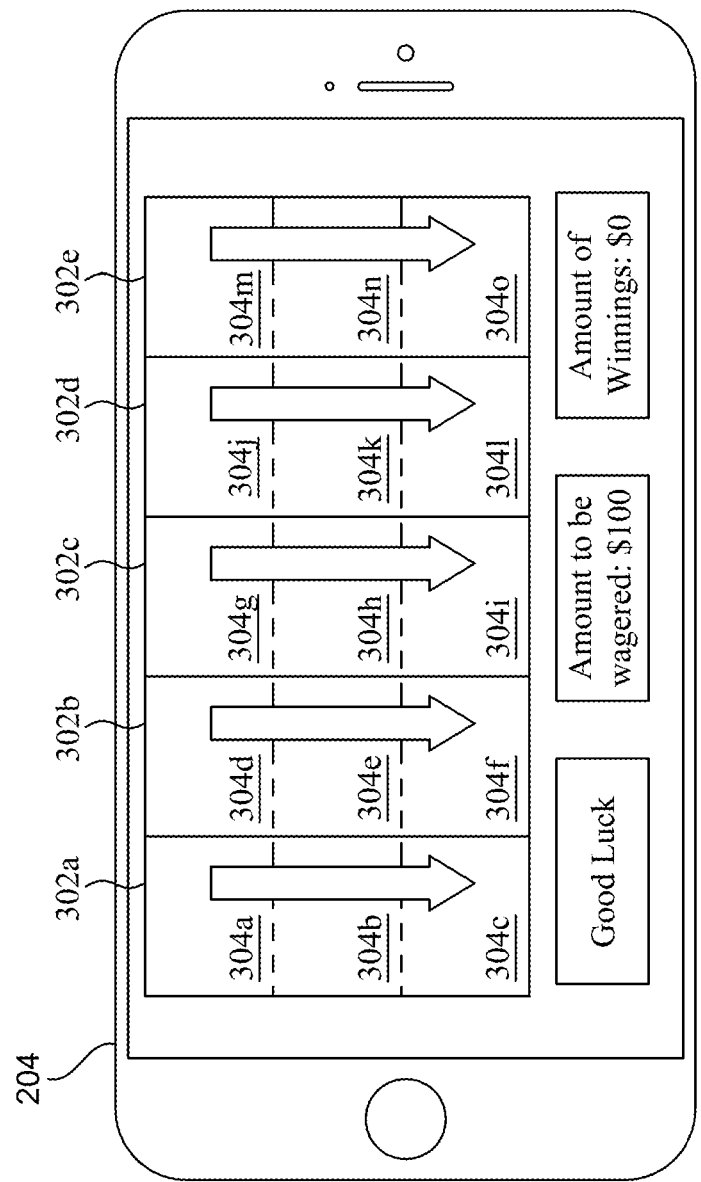

For the initiated play of the game, the remote game server requests a game outcome seed from the cloud-based CDS server. In one such embodiment, the remote game server requests game outcome seeds one at a time from the cloud-based CDS server. In this embodiment, each play of the game is associated with an individual request of a game outcome seed from the appropriate game outcome seed set. For example, as seen in FIG. 3C, following the user interfacing with the GPD to make one or more inputs to initiate the play of a reel game and the amount to be wagered balance maintained by the balance management server and displayed by the GPD decreasing from $100 to $95 to reflect the purchase of a play of a $5 game, a plurality of reels 302*a* to 302*e* associated with a plurality of symbol display positions 304*a* to 304*o* that form a symbol display position matrix start spinning. In this example, in addition to causing the GPD to display an initiation of the play of the game, the remote game server communicates a request for a game outcome seed from the cloud-based CDS server.

In another such embodiment, the remote game server requests game outcome seeds as part of a batch request from the cloud-based CDS server. In this embodiment, if the user has committed to playing a plurality of plays of one or more games and the balance management server has authorized the plurality of plays, the remote game server batch processes these commitments and requests a plurality of game outcome seeds from the appropriate game outcome seed set(s). In such instances, for each initiated play of the game, the remote game server first determines if any game outcome seeds remain from the purchased batch. If so, the remote game server utilizes one of the game outcome seeds from the purchased batch without requesting a game outcome seed from the cloud-based CDS server. If not, the remote game server request another game outcome seed (or another batch of game outcome seeds) from the cloud-based CDS server.

In certain embodiments, each single play game outcome seed is associated with (or otherwise deterministic of) a single predetermined game outcome for a single play of the game. For each single game outcome seed, the single predetermined game outcome (which that game outcome seed is deterministic of) includes an outcome component (i.e., a win game or a lose game) and a value component (i.e., the award amount, if any). In certain embodiments, for each single game outcome seed, the single predetermined game outcome (which that game outcome seed is deterministic of) also includes a presentation component (i.e., how the game outcome will be presented or displayed).

In certain embodiments, each single play game outcome seed is associated with (or otherwise deterministic of) a plurality of predetermined game outcomes for a plurality of plays of the game. For each game outcome seed, each of the predetermined game outcomes (which that game outcome seed is deterministic of) includes an outcome component (i.e., a win game or a lose game) and a value component (i.e., the award amount, if any). In certain embodiments, for each game outcome seed, each of the predetermined game outcomes (which that game outcome seed are deterministic of) also includes a presentation component (i.e., how the game outcome will be presented or displayed).

In certain embodiments, different games available to be played having different attributes (e.g., different wager amounts, different themes, different paytables) are associated with different sets or pools of game outcomes seeds. That is, such different available games are associated with different sets or pools of game outcome seeds specific to the game played. For example, a poker game played on a first GPD utilizes a first set or pool of game outcome seeds and a slots game played on a second, different GPD utilizes a second, different set or pool of game outcome seeds. In certain such embodiments, the cloud-based CDS server maintains game outcome seed sets, wherein each game outcome seed set is associated with one or more games at a particular cost per play of that game. In one such embodiment, the cloud-based CDS server maintains a game outcome seed set for each different game at each different cost. For example, with reference to FIG. 3B, the cloud-based CDS server maintains a first game outcome seed set for $5 Game 1, a second game outcome seed set for $5 Game 2, a third game outcome seed set for $5 Game 3, and a fourth game outcome seed set for $5 Game 4. In another such embodiment, the cloud-based CDS server maintains a game outcome seed set for multiple different games at each different cost. For example, with reference to FIG. 3B, the cloud-based CDS server maintains a first game outcome seed set for $5 Game 1 and $5 Game 2, and a second game outcome seed set for $5 Game 3, and $5 Game 4. In another example, the cloud-based CDS server maintains a game outcome seed set on a per game cost basis. For example, with reference to FIG. 2B, the cloud-based CDS server maintains a single game outcome seed set for the $5 Game 1, the $5 Game 2, the $5 Game 3, and the $5 Game 4.

In certain embodiments wherein the remote game server enables a user to interface with the GPD to initiate, subject to approval by the balance management server, plays of games associated with different wager amounts, the cloud-based CDS server utilizes different pools of game outcome seeds for the different wager amounts. In another embodiment wherein the remote game server enables a user to interface with the GPD to initiate, subject to approval by the balance management server, plays of games associated with different wager amounts, the cloud-based CDS server utilizes the same pool of game outcome seeds irrespective of the wager amount. In this embodiment, rather than the predetermined game outcomes associated with the game outcome seeds having static game outcome value components, each predetermined game outcome has a dynamic game outcome value component which is determined based on a game outcome multiplier of the predetermined game outcome value component applied to the purchase price of that game.

Upon receiving the request for one or more game outcome seeds, the cloud-based CDS server randomly selects one or more game outcome seeds from the maintained game outcome seed set utilized for the initiated play of the game. Such a configuration instills a degree of randomness (i.e., which game outcome seed is randomly determined) to a system employed in a jurisdiction with regulatory rules that do not permit the use of probability-based gaming. Additionally, such central production or control of game outcome seeds can assist an entity in maintaining appropriate records, controlling gaming, reducing and preventing cheating or electronic or other errors, reducing or eliminating win-loss volatility and the like.

Following the selection of a game outcome seed, the cloud-based CDS server removes the selected game outcome seed from the game outcome seed set. Once removed from the game outcome seed set, the specific selected game outcome seed from that specific game outcome seed set cannot be selected again. Such removal of the selected game outcome seed provides users with all of the available predetermined game outcomes (which the game outcome seeds are deterministic of) over the course of the play cycle and guarantees the actual wins and losses. For example, if prior to the current play of the game, a game outcome seed set associated with that game includes 100,000 game outcome seeds, after the cloud-based CDS server randomly selected one of the game outcome seeds and removed that game outcome seed, the game outcome seed set associated with that game now includes 99,999 game outcome seeds.

Following the selection and removal of a game outcome seed from a game outcome seed set, the cloud-based CDS server communicate data associated with the selected game outcome seed to the remote game server. Upon receiving data associated with the selected game outcome seed, the remote game server determines, for the initiated play of the game, the predetermined game outcome associated with the selected game outcome seed. In certain embodiments, upon determining the predetermined game outcome associated with the selected game outcome seed, the remote game server communicates data associated with the value component of the predetermined game outcome to the balance management server. Upon receiving the data associated with the value component, the balance management server updates the applicable balance maintained by the balance management server to reflect the amount of any win.

Figure 3D:
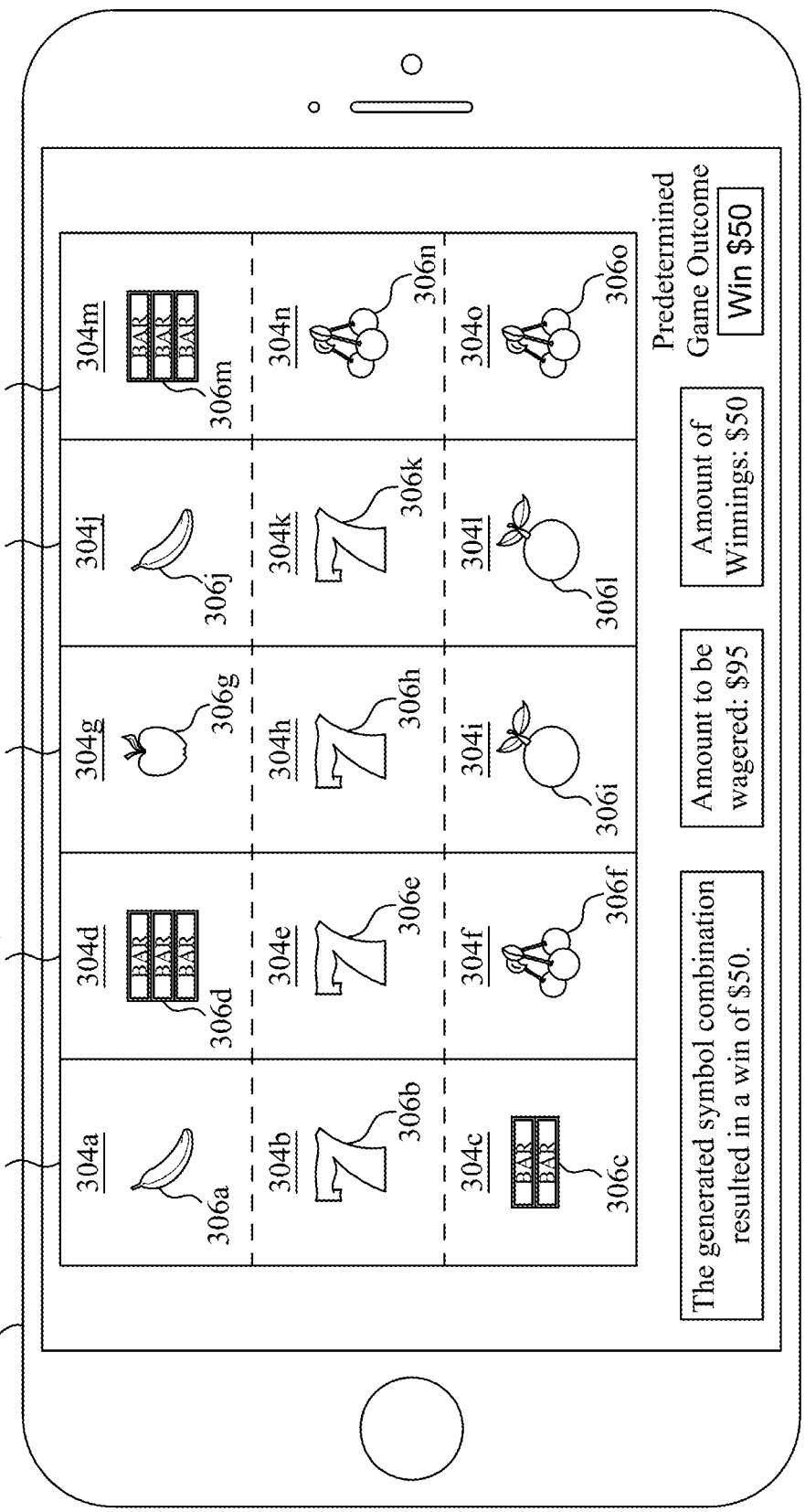

In certain embodiments, in addition to communicating data which results in the updating of the applicable balance maintained by the balance management server and displayed by the GDP, the remote game server causes the GPD to display the presentation component of the predetermined game outcome determined utilizing the selected game outcome seed and further causing the GPD to display an award amount (i.e., the value component of the predetermined game outcome determined utilizing the selected game outcome seed). More specifically, the remote game server utilizes the selected game outcome seed in a random number sequence generator to generate random numbers which are then used to determine a predetermined game outcome. The remote game server then communicates data to both the balance management server to update the applicable balance maintained by the balance management server as well to the GPD to display the predetermined game outcome determined from the selected game outcome seed. For example, as seen in FIG. 3D, since the selected game outcome seed is deterministic of a win of $50 (shown in FIG. 3D for illustration purposes only), the remote game server causes the GPD to display, such as through an application being executed by the GPD or an internet browser of the GPD, the reels to stop spinning to display a plurality of symbols 306a to 306o (at the plurality of symbol display positions 304a to 304o associated with the plurality of reels 302a to 302e) that form one or more winning symbol combinations along one or more paylines that collectively are associated with a win of $50. In this example, following the display of the predetermined game outcome associated with a win of $50, the balance management server (and/or the remote game server) causes the GPD to display that the won credit meter (i.e., the amount of winnings balance maintained by the balance management server and displayed by the GPD) reflects the $50 amount won.

It should thus be appreciated that in certain embodiments, computerized instructions for controlling any games (such as any primary or base games and/or any secondary or bonus games) displayed by the GPD are executed by the remote game server. In such "thin client" embodiments, the remote game server remotely controls any games (or other suitable interfaces) displayed by the GPD (i.e., the GPD operates as the client device) and the GPD is utilized to display such games (or suitable interfaces) and to receive one or more inputs or commands. In certain embodiments in which the remote game server is on-site (i.e., located substantially proximate to the GPD), the GPD and remote game server communicate through a first data network, such as a local area network (LAN). In certain embodiments in which the remote game server is off-site (i.e., located remote from the GPD) or a cloud-based remote game server, the GPD and the remote game server communicate through a second data network, such as a wide area network (WAN). In certain embodiments in which the GPD and the remote game server communicate through a data network, the data network is an internet (such as the Internet) or an intranet. In certain such embodiments, an Internet browser of the GPD is usable to access an Internet game page from any location where an Internet connection is available. In one such embodiment, after the GPD accesses the Internet game page, the remote game server (and/or the balance management server operating with the remote game server) identifies a user before enabling that user to place any wagers on any plays of any games. In one example, the remote game server (and/or the balance management server operating with the remote game server) identifies the user by requiring a user account of the user to be logged into via an input, at the GPD, of a unique username and password combination assigned to the user. The remote game server (and/or the balance management server operating with the remote game server) may, however, identify the user in any other suitable manner, such as by validating a player tracking identification number associated with the user; by reading a player tracking card or other smart card inserted into a card reader; by validating a unique user identification number associated with the user by the remote game server (and/or the balance management server operating with the remote game server); and/or by identifying the GPD, such as by identifying the MAC address or the IP address of the Internet facilitator. In various embodiments, once the remote game server (and/or the balance management server operating with the remote game server) identifies the user, the remote game server enables a request to be made by the user at the GPD for a placement of one or more wagers on one or more plays of one or more games.

In certain such embodiment, the game presentation device, the balance management server and the remote game server interact with each other to enable a gaming service to be provided on the game presentation device which is funded by an amount of funds associated with a gameplay ticket voucher obtained at a POS terminal. In these embodiments, in association with employing the gameplay ticket voucher to fund a gaming session, the game presentation device enables the user to access the balance management server via accessing an application or launching a web browser, going to a website provided by the balance management server and logging into the site. After a successful login, the balance management server creates a gaming session (or accesses a previously created gaming session) for the game presentation device. For the gaming session, the balance management sends information to the game presentation device that enables an interface to be generated on the game presentation device. In certain embodiments, the user navigates, via the game presentation device, to a link for the gaming service they are interested in utilizing, such as a desired game they wish to play. The game presentation device enables the user to select the link which causes information to be communicated to the balance management server. After the link is selected, the balance management server communicates information to the remote game server that enables a connection between the game presentation device and the remote game server to be established. This information may include but is not limited to, details about the user as well as security credentials used by the remote game server to validate the request. The balance management server (and/or the remote game server) then send information to the game presentation device, enable the game presentation device to receive information from the remote game server. Following this connection, the remote game server and/or the balance management server communicate information to the game presentation device that generates a modification on the game presentation device interface. For example, a new browser window is launched on the game presentation device and the game presentation device is redirected to the remote game server. In certain instances, the new browser window is customized with graphics, audio, or other media to maintain a consistent audio and visual presentation between the game and the balance management server. In another example, the remote game server (and/or the balance management server) cause a download of custom or proprietary software application that is compatible with the game presentation device for playing a game employing predetermined game outcomes in response to information received from the remote game server. As such, the game presentation device, the balance management server and the remote game server operate with each other to deploy a customizable gaming interface and a library of games employing predetermined game outcomes to a non-gaming regulated device.

In certain embodiments, providing the predetermined game outcome associated with the selected game outcome seed includes the remote game server causing the GPD to display a SOC-type lottery ticket associated with the selected game outcome seed. In these embodiments, the predetermined game outcome associated with the selected game outcome seed takes the form of a displayed instant lottery ticket, such as a scratcher instant lottery game. Such an instant lottery ticket include a displayed a ticket substrate, a displayed front surface of the ticket substrate, a displayed predefined scratch-off area defined on the front surface, a displayed a scratch-off coating displayed as covering variable lottery game indicia on the predefined scratch-off area, and variable instant lottery ticket information indicia displayed on the front surface. The remote game server causes the GDP to display an employment of the variable lottery game indicia to indicate the predetermined game outcome associated with the selected game outcome seed.

In certain embodiments, the system determines a predetermined game outcome and/or award based on the results of a bingo or keno game. In certain such embodiments, the system utilizes one or more bingo or keno games to determine the predetermined game outcome and/or award provided for a play of a game. For example, the system employs a bingo card including a matrix or array of elements, wherein each element is designated with separate indicia. In this example, the system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments, the game comprises a secondary game and the game triggering event occurs based on a displayed event associated with a play of a primary game. In certain other embodiments, the game comprises a secondary game and the game triggering event occurs based on an event independent of any displayed event associated with the play of the primary game. In these different embodiments, since the game is not associated with any reduction of the balance maintained by the balance management server, the remote game server bypasses requesting the balance management server for authorization to initiate the play of the game. Rather, the remote game server proceeds with communicating data to the GPD to display an initiation of a play of the game.

While illustrated in FIGS. 3C and 3D as a slots game that employs predetermined game outcomes, it should be appreciated that any suitable game that employs predetermined game outcomes may be utilized. In different embodiments, the game includes but is not limited to: a play of any suitable slot game that employs predetermined game outcomes; a play of any suitable wheel game that employs predetermined game outcomes, a play of any suitable card game that employs predetermined game outcomes, a play of any suitable multi-hand card game that employs predetermined game outcomes, a play of any suitable keno game that employs predetermined game outcomes a play of any suitable offer and acceptance game that employs predetermined game outcomes, a play of any suitable award ladder game that employs predetermined game outcomes, a play of any suitable puzzle-type game that employs predetermined game outcomes, a play of any suitable selection game that employs predetermined game outcomes, a play of any suitable cascading symbols game that employs predetermined game outcomes, a play of any suitable ways to win game that employs predetermined game outcomes, a play of any suitable scatter pay game that employs predetermined game outcomes, a play of any suitable coin-pusher game that employs predetermined game outcomes, a play of any suitable elimination game that employs predetermined game outcomes, a play of any suitable trail game that employs predetermined game outcomes, a play of any suitable bingo game that employs predetermined game outcomes, a play of any suitable video scratch-off game that employs predetermined game outcomes, a play of any suitable pick-until-complete game that employs predetermined game outcomes, a play of any suitable shooting simulation game that employs predetermined game outcomes, a play of any suitable racing game that employs predetermined game outcomes, a play of any suitable promotional game that employs predetermined game outcomes, a play of any suitable high-low game that employs predetermined game outcomes, a play of any suitable lottery game that employs predetermined game outcomes, a play of any suitable number selection game that employs predetermined game outcomes, a play of any suitable dice game that employs predetermined game outcomes, a play of any suitable skill game that employs predetermined game outcomes, a play of any suitable auction game that employs predetermined game outcomes, a play of any suitable reverse-auction game that employs predetermined game outcomes, a play of any suitable group game that employs predetermined game outcomes, a play of any suitable game that employs predetermined game outcomes in a service window, a play of any suitable game that employs predetermined game outcomes on a mobile device, and/or a play of any suitable game that employs predetermined game outcomes of the present disclosure.

In different embodiments, one or more awards provided in association with the play of the game (that are predetermined in accordance with a game outcome seed) include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing ticket vouchers, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable, virtual goods associated with the system, virtual goods not associated with the system, an access code usable to unlock content on an internet.

In one embodiment, at least one display device of the GPD displays the play of the game. In another embodiment, the system additionally or alternatively causes one or more community or overhead display devices to display part or all of the play of the game with to one or more bystanders either within the non-gaming establishment or viewing over a network, such as the internet. In another embodiment, the system additionally or alternatively causes one or more internet sites to each display the play of the game such that a user is enabled to log on from a personal web browser. In another such embodiment, the system enables the user to view the play of the game on one device while viewing another play of the game from another device.

While illustrated in FIGS. 3C and 3D as a slots game that does not display any selectively activated features, it should be appreciated that any suitable feature that may be selectively activated to assist in the delivery of a predetermined game outcome may be employed in accordance with the present disclosure. In different embodiments, such features include, but are not limited to: a feature that modifies one or more components, aspects, or elements of a play of a game, such as a feature that modifies a game outcome (e.g., the symbols evaluated for the play of the game) to correspond to the predetermined game outcome determined from the game outcome seed, a feature that modifies the paytable utilized for the play of the game, a feature that modifies any award determined for the play of the game to correspond to the award associated with the predetermined game outcome determined from the game outcome seed, a feature that superimposed one or more symbols over the symbols of the reels; a feature that replaces one or more symbols of the symbols of the reels with a predetermined symbol pattern; a feature that replaces one or more symbols of the reels with a predetermined pattern of wild symbols; a modifier, such as a multiplier, feature; a moving wilds feature; a book-end wild symbols feature; a stacked wild symbols feature; an expanding wild symbols feature; a nudging wild symbols feature; a retrigger symbol feature; an anti-terminator symbol feature; a locking reel feature, a locking symbol position feature; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying a paytable utilized for a play of a game; a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying that progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying how one or more aspects of one or more games (e.g., colors, speeds, sound) are displayed to a player; and/or a feature modifying any game play feature associated with any play of any game of the present disclosure.

In certain embodiments, in association with the purchase of a play of a game employing a predetermined game outcome, a request of a game outcome seed from the cloud-based CDS server, the selection of a game outcome seed by the cloud-based CDS server and/or a display by the GPD (operating with the remote game server and the balance management server) of a predetermined game outcome determined by the selected game outcome seed, the cloud-based CDS server, the remote game server and/or the balance management server communicate data to the POS terminal (and/or a server associated with the POS terminal) regarding the play of a game employing a predetermined game outcome, the request of a game outcome seed from the cloud-based CDS server, the selection of the game outcome seed by the cloud-based CDS server and/or the display by the GPD of the predetermined game outcome determined by the selected game outcome seed. That is, since in certain embodiments, the financial transactions associated with procuring an amount to be wagered via the purchase of a balance of funds usable to obtain predetermined game outcomes occur at one or more POS terminals and since, in certain embodiments, the presentation of a predetermined game outcome from a cloud-based CDS server selected game outcome seed occurs at a GPD operating with a remote game server and/or a balance management server, in accordance with various jurisdictional regulations, the financial aspects of playing games associated with predetermined game outcomes (e.g., the financial aspects of purchasing certain lottery tickets) is handled by and periodically reported to the POS terminal by such other components tasked with certain aspects of the system. Such a configuration provides that certain non-gaming establishments, such as retailers, located in jurisdictions where pull-tab games and/or instant ticket lottery games are permitted (but where probability-based gaming is prohibited) sell and redeem pull-tab games and/or instant ticket lottery games (through a POS terminal associated with that establishment), while the user's experience in the presentation of such purchased games more closely tracks that of a probability-based gaming environment (through the interaction with the GPD).

In various embodiments where the identity of the user is known, the system operates with one or more patron management systems to enable operators to recognize the value of customer loyalty by identifying frequent customers and rewarding them for their patronage. Such a patron management system is configured to track a user's activity, such as gameplay ticket vouchers purchased from the POS terminal and/or plays of games employing predetermined game outcomes displayed via the GPD. In these embodiments, the system timely tracks any suitable information or data relating to the identified user's gaming session. The system also timely tracks when the gaming session is concluded and no more activity should be attributed to the user. In different embodiments, during one or more gaming sessions, the system tracks any suitable information or data, such as costs of each game played, average cost of games played, and/or the time at that these costs are incurred. In different embodiments, for one or more users, the patron management system includes the user's account number, the user's card number, the user's first name, the user's surname, the user's preferred name, the user's tracking ranking, any promotion status associated with the user's tracking card, the user's address, the user's birthday, the user's anniversary, the user's recent gaming sessions, or any other suitable data. In various embodiments, such tracked information and/or any suitable feature associated with the patron management system is displayed to the user via any suitable interface, such as a player tracking display, a service window displayed by the GPD and/or by the POS terminal.

It should be appreciated that the employment of a cloud-based CDS server (i.e., a processor operating in a cloud-native environment) to select game outcome seeds enables the cloud-based CDS server to service multiple locations that each have one or more POS terminals connecting to one or more GPDs, one or more remote game servers and/or one or more balance management servers. That is, unlike certain prior central determination system servers that required an on-site server isolated from external systems and hard-wired to the electronic gaming machines at that particular location, the utilization of a cloud-based CDS server enables multiple POS terminals, multiple remote game servers, multiple balance management servers and/or multiple GPDs that are connected to the cloud (either directly via communication from the POS terminal and/or directly to/from the cloud-based CDS server on the Internet or via a proxy such as via local software running on a local network, that the POS terminal, remote game server, balance management server and/or GPD communicates with and that passes messages back and forth) to offer plays of games with predetermined game outcomes at venues where such offering was previously unavailable. As such, rather than requiring hundreds (or even thousands) of on-site servers for hundreds (or even thousands) of locations within a jurisdiction that offer plays of lottery games (e.g., pull-tab games and/or instant ticket lottery games), the deployment of a cloud-based CDS server solution enable each of the locations within the jurisdiction to offer plays of such lottery games while reducing the risks of downtime at each individual location in the event the on-site server at that individual location becomes inoperable. Moreover, the deployment of a cloud-based CDS server solution which is in communication with the remote game servers, balance management servers, GPDs and/or POS terminals at the different locations within a jurisdiction enables any modifications (e.g., updates) to such different components to occur in a relatively more efficient and timely manner than prior systems reliant on disparate on-site servers. Accordingly, the use of a cloud-based system which includes distributed systems and devices (such as those based on the cloud), as well as software, firmware, and other components configured to carry out one or more of the functions of the present disclosure overcomes technical hurdles that prior on-site central determination systems incurred with scalability to achieve scalable management of geographically distributed components.

Figure 4:
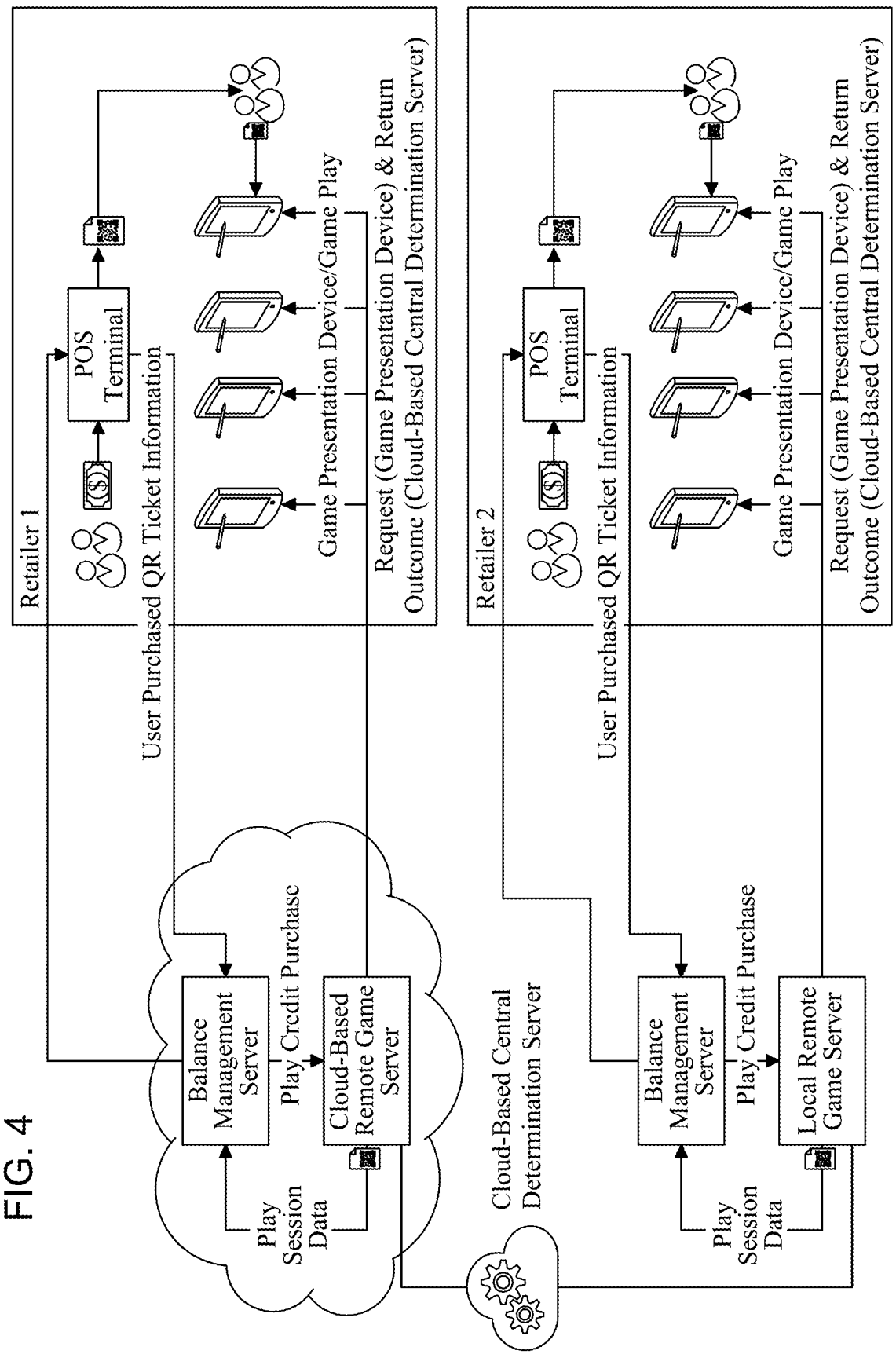
FIG. 4 is a schematic diagram of the interactions between a plurality of different components of the system of one embodiment of the present disclosure that operate to provide plays of games using predetermined game outcomes.

Accordingly, as illustrated in FIG. 4, for each of a plurality of locations, the cloud-based CDS server offers services to a plurality of GPDs at such locations. In operation and at each individual location of the system, following a user depositing, via a direct deposit and/or via from one or more accounts associated with the user, an amount of funds into a POS terminal at a respective location, the POS terminal issues a gameplay ticket voucher associated with the amount of funds. As further seen in FIG. 4, the user deposits the gameplay ticket voucher into a GPD at that respective location. The GPD then communicates data associated with the gameplay ticket voucher to the balance management server (or to the remote game server which communicates such data to the balance management server) that establishes a balance of wagerable funds maintained by the balance management server and displayed by the GPD. Such a balance of wagerable funds maintained by the balance management server and displayed by the GPD is then drawn against to purchase one or more plays of one or more games. For each purchased play of a game, the remote game server operates with the cloud-based CDS server to request and receive a game outcome seed (which is deterministic of a predetermined game outcome for the purchased play of the game). The remote game server operates with the GPD to cause the GPD to display the predetermined game outcome and any value component determined from the game outcome seed. Data regarding such a value component is additionally communicated to the balance management server which operates to increase a balance of winnings maintained by the balance management server. Such a balance of winnings maintained by the balance management server and displayed by the GPD is ultimately transferred to a winnings ticket voucher and redeemable at the POS terminal for an amount of funds.

It should be appreciated that while FIG. 4 illustrates: (i) the GPDs in communication with the remote game server, (ii) the remote game server in communication with the balance management server and the cloud-based CDS server, and (iii) the balance management server in communication with the POS terminal, in different embodiments, different components are operable to communicate directly (or indirectly) with each other. For example, the remote game server (in addition to or alternative from the balance management server) communicates data directly (or indirectly) to the POS terminal. In another example, the balance management server (in addition to or alternative from the remote game server) communicates data directly (or indirectly) to one or more GPDs.

It should be further appreciated that in certain embodiments, the system of the present disclosure operates to, responsive to a receipt of data associated with a redemption of a gameplay ticket voucher issued from a POS terminal, communicate data that results in a display device of a GPD displaying, based on a first amount of non-cashable funds associated with the gameplay ticket voucher, a modification of a first balance of non-cashable funds dedicated to a quantity of plays of lottery games offered by a lottery authority. When redeemed, the gameplay ticket voucher is independent of any individual plays of any individual lottery games. In these embodiments, responsive to a receipt of data associated with an input to allocate at least part of the first amount of non-cashable funds associated with the gameplay ticket voucher to a play of a lottery game offered by the lottery authority and a determination that the first balance of non-cashable funds at least equals a cost associated with the play of the lottery game, the system communicates, to a remote game server, data authorizing the play of the lottery game, and communicates data that results in the display device of the GPD displaying, based on the cost associated with the play of the lottery game, a further modification of the first balance of non-cashable funds. Additionally and responsive to a receipt, from the remote game server, of data associated with a predetermined game outcome associated with a game outcome seed selected by a cloud-based central determination system server from a set of game outcome seeds, the system communicates data that results in the display device of the GPD displaying, based on any value component associated with the predetermined game outcome, a modification of a second balance of a first amount of cashable funds.

In certain such embodiments, the gameplay ticket voucher includes a virtual gameplay ticket voucher. In certain additional or alternative embodiments, the play of the lottery game includes an instant ticket lottery game. In certain additional or alternative embodiments, the quantity of plays of lottery games includes a single play. In certain additional or alternative embodiments, the predetermined game outcome is displayed by the display device of the GPD as an outcome associated with a play of a game displaying a plurality of symbols at a plurality of symbol display positions associated with a plurality of reels.

In certain additional or alternative embodiments, the system enables a transfer of a second amount of cashable funds from the second balance displayed by the display device of the GPD to the first balance displayed by the display device of the GPD such that after the transfer, the second amount of cashable funds is converted to a second amount of non-cashable funds. In certain such embodiments, the system causes the automatic transfer the second amount of cashable funds from the second balance displayed by the display device of the GPD to the first balance displayed by the display device of the GPD responsive to the determination being that the first balance of non-cashable funds displayed by the display device of the GPD is less than the cost associated with the play of the lottery game. In certain additional or alternative embodiments, the system communicates data associated with the play of the lottery game, the data includes at least one of: the first balance of non-cashable funds prior to the further modification, the first balance of non-cashable funds after the further modification, the second balance of cashable funds prior to the display of the predetermined game outcome, the second balance of cashable funds after the display of the predetermined game outcome, the cost associated with the play of the lottery game, the predetermined game outcome, and any value component associated with the predetermined game outcome.

It should be further appreciated that in certain embodiments, the system of the present disclosure operates to communicate, to a balance management server, a request to allocate at least part of a first amount of non-cashable funds associated with a gameplay ticket voucher to a play of a lottery game offered by a lottery authority. In these embodiments, the gameplay ticket voucher was issued by a POS terminal and redeemed in association with a GPD, and when redeemed, the gameplay ticket voucher is independent of any individual plays of any individual lottery games and the first amount of non-cashable funds is dedicated to funding plays of lottery games offered by the lottery authority. In these embodiments, responsive to a receipt, from the balance management server, of an authorization of the request, the system communicates, to a cloud-based central determination system server, a request for a game outcome seed from a set of game outcome seeds. Additionally and responsive to a receipt, from the cloud-based central determination system server, of data associated with the game outcome seed, the system determines a predetermined game outcome from the data associated with the game outcome seed, communicates data that results in a display device of the GPD displaying the predetermined game outcome, and communicates, to the balance management server, data associated with any value component of the predetermined game outcome.

In certain such embodiments, the processor includes a cloud-based processor. In certain such embodiments, the game presentation device includes a mobile device. In certain such embodiments, the game outcome seed is prevented from being selected again from the set of game outcome seeds.

In various embodiments, in addition to operating as a delivery device for predetermined game outcomes obtained using a balance purchased via a POS terminal, the balance management server enables a user to interface with the GDP to cashout one or more balances maintained by the balance management server and displayed by the GPD. In these embodiments, upon a gaming session termination event, the balance management server operates with the POS terminal to make the amount of funds of the cashed out balance of funds available to the user. As such, in these embodiments, while any predetermined game outcomes (selected from the cloud-based CDS server as game outcome seeds) are presented via the GPD, any winnings associated with such predetermined game outcomes are delivered via the POS terminal.

In certain embodiments, upon a gaming session termination event, such as upon a cashout input received by the GPD, the GPD communicates data regarding the occurrence of the gaming session termination event to the balance management server (or to the remote game server which communicates such data to the balance management server). In these embodiments, the balance management server determines whether to authorize the exchange of the amount of funds of the balances maintained by the balance management server for a winnings ticket voucher having a corresponding amount of funds. If the balance management server determines not to cash out of the balances maintained by the balance management server for a winnings ticket voucher, the balance management server communicates to the GPD (or to the remote game server to communicate to the GPD) a denial message to display to the user and the balance management server does not cause any winnings ticket vouchers to be issued. For example, if only the winnings balance maintained by the balance management server (i.e., the balance that increases based on amounts won from plays of games employing predetermined game outcomes) may be cashed out and the balance management server determines that the winnings balance maintained by the balance management server is zero, the balance management server denies the issuance of a winnings ticket voucher even if the amount to be wagered balance is greater than zero. In another example, if funds used to procure a gameplay ticket voucher cannot be returned to the user (i.e., such funds must be used for game play at a GPD) and the balance management server determines that the amount to be wagered balance is greater than zero (i.e., an amount of funds used to procure a gameplay ticket voucher remain), the balance management server denies the issuance of a winnings ticket voucher for such funds (in certain instances, even if the amount of winnings balance is greater than zero).

On the other hand, if the balance management server determines to authorize the cashing out of the balances maintained by the balance management server for a winnings ticket voucher, the balance management server: (i) updates the credit balances maintained by the balance management server to reflect the exchange of an amount of funds of the credit balances for a winnings ticket voucher, (ii) communicates data to the GPD to reflect the updated credit balances maintained by the balance management server, and (iii) issues a winnings ticket voucher for an amount of funds of the cashed out credit balances. It should be appreciated that since a created winnings ticket voucher may take multiple forms, the system includes multiple ways to convey such a created winnings ticket voucher to the user. In one embodiment wherein the created winnings ticket voucher takes the form of a physical winnings ticket voucher, the GPD causes a printer to print the created winnings ticket voucher. In another embodiment wherein the created winnings ticket voucher takes the form of a virtual winnings ticket voucher, the GPD (and/or a component of the GPD) communicates data to a device associated with the user, such as a mobile device running an application, to transfer the created virtual winnings ticket voucher to the user. In certain embodiments, if the GPD comprises a mobile device, the GPD stores the created virtual winnings ticket voucher prior to the GPD interfacing with the POS terminal to redeem the virtual winnings ticket voucher.

In certain embodiments, in association with issuance of a winnings ticket voucher, the balance management server (and/or the remote game server) stores a record of the winnings ticket voucher. Such a record of the winnings ticket voucher includes, for each winnings ticket voucher, winnings ticket voucher identification information including, but not limited to, one or more of: (i) a winnings ticket voucher vendor name; (ii) a winnings ticket voucher vendor address; (iii) a winnings ticket voucher title (e.g., "lottery winnings ticket voucher"); (iv) a winnings ticket voucher validation number (e.g., an eighteen digit number or code of the issued winnings ticket voucher displayed on the winnings ticket voucher); (v) a winnings ticket voucher validation number machine-readable code (e.g., a bar code and/or a QR code that contains an encoded winnings ticket voucher validation number; (vi) a ticket date/time (i.e., a date/time when the winnings ticket voucher was issued); (vii) a ticket number (e.g., a sequential number on the winnings ticket voucher); (viii) an amount (i.e., an amount of the winnings ticket voucher as a numerical value with a currency sign); (ix) an amount in words (i.e., the amount of the issued winnings ticket voucher in words); (x) any expiration (i.e., an expiration date of the winnings ticket voucher; (xi) a device identification (i.e., an asset or machine number of the POS terminal that issued the winnings ticket voucher); (xii) font or formatting information associated with the winnings ticket voucher, (xiii) an image of the winnings ticket voucher (e.g., an image of a front of the winnings ticket voucher and/or an image of a back of the winnings ticket voucher), (xiv) a primary key (i.e., an index for the record in the table), (xv) a ticket state (e.g., a state of a ticket as being in a redeemed state, an unredeemed state or a suspect state), (xvi) a redemption date (i.e., the date the winnings ticket voucher was redeemed at (if the winnings ticket voucher is in the redeemed state), (xvii) redeemed at (i.e., the device where the winnings ticket voucher was redeemed (if the winnings ticket voucher is in the redeemed state), (xviii) a data signature (i.e., a signature of the data associated with the winnings ticket voucher to prevent tampering); and/or (xix) compliance with any associated redemption limits or controls.

In certain embodiments, once issued, the balance management server and/or remote game server operate with the GPD (and/or another GPD) to enable the winnings ticket voucher to be received to establish one or more balances maintained by the balance management server and displayed by that GPD. In one such embodiment, the different balances cashed out via interfacing with a GPD onto a winnings ticket voucher are reestablished as different balances displayed by the GPD that receives that winnings ticket voucher. For example, if a winnings ticket voucher is associated with both a positive winnings balance cashed out from a first GPD and a positive amount to be wagered balance cashed out from the first GPD, upon a second GPD receiving the winnings ticket voucher, the balance management server operates with the second GPD to establish both balances. In another such embodiment, the different balances cashed out via interfacing with a GPD onto a winnings ticket voucher are partially reestablished in association with the GPD that receives that winnings ticket voucher. For example, if a winnings ticket voucher is associated with both a positive winnings balance cashed out via interfacing with a first GPD and a positive amount to be wagered balance cashed out via interfacing with the first GPD, upon a second GDP receiving the winnings ticket voucher, the balance management server operates with the second GPD to establish the amount to be wagered balance without reestablishing the winnings balance. In this example, the amount of the winnings balance is collectable from the POS terminal.

In certain embodiments, once issued, no GPDs may operate with the balance management server to enable any winnings ticket vouchers to be received to establish any balances of such GPDs. In these embodiments, regardless of the amounts of the balances cashed out via interfacing with a GPD and associated with a winnings ticket voucher, the GPD operates with the balance management server to prohibit any of such balances from being reestablished as any displayed balances on that GPD. In this example, the amounts of such balances are collectable from the POS terminal.

In certain embodiments, in association with the creation of one or more winnings ticket vouchers, the balance management server (and/or the remote game server) communicates data associated with the created winnings ticket vouchers to the POS terminal to store such data associated with the winnings ticket voucher issued. In these embodiments, since the POS terminal handles certain of the non-game play transactions associated with the system of the present disclosure, the POS terminal (and/or a server associated with the POS terminal) operates with various reporting systems, such as an accounting system, to track such transactions.

In certain embodiments, following the user obtaining a winnings ticket voucher, the winnings ticket voucher is redeemable at a POS terminal to realize the funds associated with such a winnings ticket voucher. In certain embodiments, following receipt of a winnings ticket voucher associated with an amount of funds, that amount of funds establishes or otherwise modifies a balance of the POS terminal. In certain such embodiments, the POS terminal is operable to receive multiple winnings ticket vouchers (which each modify the balance of the POS terminal) in association with a single transaction of making funds available to the user.

In various embodiments, following a user obtaining one or more winnings ticket vouchers, a POS terminal enables a user to attempt to redeem such winnings ticket vouchers in exchange for the amount of funds associated with such winnings ticket vouchers. In certain embodiments where the winnings ticket voucher takes the form of a physical winnings ticket voucher and that physical winnings ticket voucher is attempted to be redeemed at a POS terminal, responsive to a user inserting a winnings ticket voucher into a slot, such as a bezel, of an acceptor of the POS terminal (or scanning one or more machine-readable codes (e.g., a bar code and/or a QR code) of the winnings ticket voucher with a scanner of the POS terminal), the POS terminal (and/or a server associated with the POS terminal) attempts to identify the winnings ticket voucher attempted to be redeemed and attempts to validate the received winnings ticket voucher. In certain embodiments where the winnings ticket voucher takes the form of a virtual winnings ticket voucher, following the user scanning, with a scanner of the POS terminal, one or more machine-readable codes (e.g., a bar code and/or a QR code) displayed by the device storing the virtual winnings ticket voucher or following the user selecting, via an interface of the device that stores the virtual winnings ticket voucher, a virtual winnings ticket voucher to redeem, the device storing the virtual winnings ticket voucher communicates with the POS terminal (and/or a server associated with the POS terminal) to identify the winnings ticket voucher attempted to be redeemed and attempts to validate the received winnings ticket voucher.

In certain embodiments, upon the POS terminal (and/or a server associated with the POS terminal) identifying the winnings ticket voucher attempted to be redeemed, the POS terminal (and/or a server associated with the POS terminal) attempts to validate the received winnings ticket voucher. In certain embodiments, such an attempted validation of the received winnings ticket voucher includes determining if any redemption limits or controls are associated with the winnings ticket voucher that prevent the validation of the winnings ticket voucher in association with the requested transaction. In one such embodiment, a redemption control pertains to the type of device that may or may not redeem the winnings ticket voucher. In another such embodiment, a redemption control additionally or alternatively pertains to the location where a winnings ticket voucher may or may not be redeemed at. In another such embodiment, a redemption control additionally or alternatively pertains to a value of the winnings ticket voucher that may or may not be redeemed using a particular type of device and/or at a particular location. In another such embodiment, a redemption control additionally or alternatively pertains to an age of the winnings ticket voucher that may or may not be redeemed using a particular type of device and/or at a particular location. In another such embodiment, a redemption control additionally or alternatively pertains to an identity of a holder of the winnings ticket voucher (if known) that may or may not be redeemed using a particular type of device and/or at a particular location.

If the POS terminal (and/or a server associated with the POS terminal) determines, at least partially based on any applicable redemption controls, not to validate the received winnings ticket voucher, the POS terminal (and/or a server associated with the POS terminal) rejects the attempted redemption of the winnings ticket voucher. In these embodiments, the POS terminal returns, if applicable, the winnings ticket voucher to the user of the POS terminal and displays zero, one or more messages regarding the rejection of the received winnings ticket voucher. In certain embodiments, such messages regarding the rejection of the received winnings ticket voucher are provided to the holder of the winnings ticket voucher via any suitable notification mechanism including, but not limited to, the POS terminal, a remote host controlled service window displayed by the POS terminal, a mobile device running a mobile device application, via an email, and/or via a SMS text message.

On the other hand, if the POS terminal (and/or a server associated with the POS terminal) determines, at least partially based on any applicable redemption controls, to validate the received winnings ticket voucher, the POS terminal (and/or a server associated with the POS terminal) updates one or more winnings ticket voucher databases to reflect the redemption of the received winnings ticket voucher. In addition to updating any database to reflect the redemption of the winnings ticket voucher, the POS terminal updates one or more balances to reflect the amount associated with the received winnings ticket voucher. This balance is then providable to the user of the POS terminal upon one or more cashout inputs received by the POS terminal. In one such embodiment, the balance of the POS terminal is exchanged for an amount of cash (or check) provided to the user of the POS terminal. In another such embodiment, the balance of the POS terminal is exchanged for a cashless wagering ticket (in physical or virtual form) provided to the user of the POS terminal. In another such embodiment, the balance of the POS terminal is exchanged for a transfer of an amount of funds to one or more accounts associated with the user (i.e., utilizing one or more pathways of how funds are transferred to the POS terminal from one or more accounts associated with the user in association with the issuance of a gameplay ticket voucher).

In certain embodiments, in addition to or alternative from employing winnings ticket vouchers to transfer funds displayed by a GPD to be paid out at a POS terminal, the system enables a user to interface with the GPD to facilitate a transfer of funds from the balance management server to a system account accessible by the POS terminal and the balance management server. Such funds are further associated with the user such that upon the user logging into the POS terminal and requesting access to such funds, the system transfers the funds from the account associated with the POS terminal to the balance of the POS terminal. This balance is then providable to the user of the POS terminal upon one or more cashout inputs received by the POS terminal. In one such embodiment, the balance of the POS terminal is exchanged for an amount of cash (or check) provided to the user of the POS terminal. In another such embodiment, the balance of the POS terminal is exchanged for a cashless wagering ticket (in physical or virtual form) provided to the user of the POS terminal. In another such embodiment, the balance of the POS terminal is exchanged for a transfer of an amount of funds to one or more accounts associated with the user (i.e., utilizing one or more pathways of how funds are transferred to the POS terminal from one or more accounts associated with the user in association with the issuance of a gameplay ticket voucher).

It should thus be appreciated that the system of the present disclosure utilizes different components associated with different functions to provide plays of games that employ predetermined game outcomes, such as pull-tab games, in a manner that is both preferable for certain users (in terms of the presentation of such games) and compliant with certain regulatory requirements (in terms of transacting funds associated with such games). Accordingly, in different embodiments, the financial transactions associated with procuring an amount to be wagered (via the subsequent, GPD interfacing enabled purchase of predetermined game outcomes) and redeeming any amounts won from the purchased predetermined game outcomes occur at one or more point-of-sale terminals. In these embodiments, while the financial aspects of playing games associated with predetermined game outcomes (e.g., the financial aspects of purchasing certain lottery tickets) is handled via the point-of-sale terminal, the presentation of a predetermined game outcome determined by a remote game server from a cloud-based CDS server selected game outcome seed occurs at a game presentation device. Such a configuration provides a system that enables certain vendors, located in certain jurisdictions where certain types of games (e.g., pull-tab games and/or instant ticket lottery games) are permitted but where certain other types of games (e.g., probability-based games) are prohibited, to offer users the opportunity to procure (through a point-of-sale terminal) a balance of funds to be used to play one type of game (through a game presentation device) presented as one or more of the other types of games.

It should be further appreciated that in different embodiments, one or more of: when a game triggering event occurs; which game outcome seed to select from a game outcome seed set; when to retire a game outcome seed set (and start drawing from a new game outcome seed set); which game outcome seed set to select from; how a selected game outcome seed will be displayed; and/or any determination of the present disclosure is/are predetermined, randomly determined, randomly determined based on one or more weighted percentages, determined based on a displayed event, (such as a displayed symbol or symbol combination), determined independent of any displayed event, determined based on a random determination by any server of the present disclosure, determined independent of a random determination by any server of the present disclosure, determined based on at least one play of at least one game, determined independent of any play of any game, determined based on a user's selection, determined independent of a user's selection, determined based on one or more wagers placed (such as a primary game wager or a side wager), determined independent of any wagers placed, determined based on time (such as a time of day or an amount of time elapsed since an occurrence of an event), determined independent of time (such as the time of day or an amount of time elapsed since an occurrence of an event), determined based on an amount of coin-in accumulated in one or more pools, determined independent of an amount of coin-in accumulated in one or more pools, determined based on a status of a user (i.e., a player tracking status), determined independent of a status of the user (i.e., a player tracking status), determined based on one or more other determinations of the present disclosure, determined independent of any other determination of the present disclosure or determined based on any other suitable method or criteria.

It should be further appreciated that any functionality or process of the present disclosure may be implemented via one or more servers (including one or more cloud-based CDS servers, one or more remote game servers and/or one or more balance management servers or alternatively independent from any cloud-based CDS servers, any remote game servers and/or any balance management servers), one or more GPDs, one or more components of a GPD (such as a component of a patron management system supported by or otherwise located inside the GPD), one or more POS terminals, one or more components of a POS terminal (such as a component of a patron management system supported by or otherwise located inside the POS terminal), or a mobile device executing a mobile device application. Accordingly: (i) while certain functions, features or processes are described herein as being performed by a GPD or a component associated with a GPD, such functions, features or processes may alternatively be performed by one or more servers (including, but not limited to, one or more cloud-based CDS servers, one or more remote game servers and/or one or more balance management servers), or one or more mobile device executing a mobile device applications, one or more POS terminals, or a component of a POS terminal, (ii) while certain functions, features or processes are described herein as being performed by one or more mobile device executing a mobile device applications, such functions, features or processes may alternatively be performed by one or more servers (including, but not limited to, one or more cloud-based CDS servers, one or more remote game servers and/or one or more balance management servers), one or more GPDs, one or more components of a GPD, one or more POS terminals, or one or more components of a POS terminal, (iii) while certain functions, features or processes are described herein as being performed by one or more servers (including, but not limited to, one or more cloud-based CDS servers, one or more remote game servers and/or one or more balance management servers), such functions, features or processes may alternatively be performed by one or more GPDs, one or more components of a GPD, one or more mobile device executing a mobile device applications, one or more POS terminals, or one or more components of a POS terminal, and (iv) while certain functions, features or processes are described herein as being performed by a POS terminal or a component associated with the POS terminal, such functions, features or processes may alternatively be performed by one or more GPDs, one or more components of a GPD, or one or more servers (including, but not limited to, one or more cloud-based CDS servers, one or more remote game servers and/or one or more balance management servers).

The present disclosure contemplates a variety of different systems each having one or more of a plurality of different features, attributes, or characteristics. A "system" as used herein refers to various configurations of: (a) one or more servers (including, but not limited to, one or more cloud-based CDS servers, one or more remote game servers and/or one or more balance management servers); (b) one or more game presentation devices; and/or (c) one or more POS terminals. Thus, in various embodiments, the system of the present disclosure includes: (a) one or more game presentation devices in combination with one or more servers (including, but not limited to, one or more cloud-based CDS servers, one or more remote game servers and/or one or more balance management servers); (b) one or more POS terminals in combination with one or more servers (including, but not limited to, one or more cloud-based CDS servers, one or more remote game servers and/or one or more balance management servers); (c) one or more POS terminals in combination with one or more game presentation devices; (d) one or more POS terminals, one or more game presentation devices, and one or more servers (including, but not limited to, one or more cloud-based CDS servers, one or more remote game servers and/or one or more balance management servers) in combination with one another; (e) a single game presentation device; (f) a plurality of game presentation devices in combination with one another; (g) a single POS terminal; (h) a plurality of POS terminals in combination with one another; (i) a single server (including, but not limited to, a cloud-based CDS server, a remote game server and/or a balance management server); and/or (j) a plurality of servers (including, but not limited to, one or more cloud-based CDS servers, one or more remote game servers and/or one or more balance management servers) in combination with one another. For brevity and clarity and unless specifically stated otherwise, "GPD" as used herein represents one GPD or a plurality of GPDs; "POS terminal" as used herein represents one POS terminal or a plurality of POS terminals; and "server" as used herein represents one server (including, but not limited to, one cloud-based CDS server, one remote game server and/or one balance management server) or a plurality of servers (including, but not limited to, a plurality of cloud-based CDS servers, a plurality of remote game servers and/or a plurality of balance management servers).

As noted above, in various embodiments, the system includes a GPD operating in combination with one or more servers, such as a cloud-based CDS server, a remote game server, and a balance management server. In such embodiments, the GPD is configured to communicate with one or more of such servers through a data network or remote communication link. In certain such embodiments, the GPD is configured to communicate with another GPD through the same data network or remote communication link or through a different data network or remote communication link. For example, the system includes a plurality of GPDs that are each configured to communicate with one or more of such servers through a data network.

In certain embodiments in which the system includes a GPD operating in combination with one or more servers, such as a cloud-based CDS server, a remote game server, and a balance management server, such servers include any suitable computing device (such as a server) that includes at least one processor and at least one memory device or data storage device. As further described herein, the GPD includes at least one GPD processor configured to transmit and receive data or signals representing events, messages, commands, or any other suitable information between the GPD and one or more of such servers. The at least one processor of that GPD is configured to execute the events, messages, or commands represented by such data or signals in conjunction with the operation of the GPD. Moreover, such servers each includes at least one processor configured to transmit and receive data or signals representing events, messages, commands, or any other suitable information between that server and the GPD. The at least one processor of each server is configured to execute the events, messages, or commands represented by such data or signals in conjunction with the operation of the server. In certain embodiments, one, more than one, or each of the functions of one or more of the servers may be performed by the at least one processor of the GPD. Further, in certain embodiments, one, more than one, or each of the functions of the at least one processor of the GPD may be performed by the at least one processor of one or more of the servers.

In certain embodiments, the above-described embodiments of the present disclosure may be implemented in accordance with or in conjunction with zero, one or more POS terminals; zero, one or more components of a POS terminal; zero, one or more GPDs, zero, one or more components of a GPD, and/or one or more servers (including, but not limited to, one or more cloud-based CDS servers, one or more remote game servers and/or one or more balance management servers). In these embodiments, such POS terminals, components of a POS terminal, GPDs, components of a GPD, and/or servers (including, but not limited to, one or more cloud-based CDS servers, one or more remote game servers and/or one or more balance management servers) each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the POS terminal, the component of the POS terminal, the GPD, the component of the GPD, and/or the server (including the remote game server, the balance management server, and/or the cloud-based CDS server); (3) accessing memory to configure or reconfigure parameters in the memory according to indicia read from the POS terminal, the component of the POS terminal, the GPD, the component of the GPD, and/or the server (including the remote game server, the balance management server, and/or the cloud-based CDS server); (4) communicating with interfaces and the peripheral devices (such as input/output devices); and/or (5) controlling the peripheral devices. In certain embodiments, one or more components of the controller (such as the at least one processor) reside within a housing of the POS terminal, the component of the POS terminal, the GPD, the component of the GPD, and/or the server (including the remote game server, the balance management server, and/or the cloud-based CDS server), while in other embodiments, at least one component of the controller resides outside of the housing of the POS terminal, the component of the POS terminal, the GPD, the component of the GPD, and/or the server (including the remote game server, the balance management server, and/or the cloud-based CDS server).

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the POS terminal, the component of the POS terminal, the GPD, the component of the GPD, and/or the server (including the remote game server, the balance management server, and/or the cloud-based CDS server) disclosed herein. In certain embodiments, the at least one memory device resides within the housing of the POS terminal, the component of the POS terminal, the GPD, the component of the GPD, and/or the server (including the remote game server, the balance management server, and/or the cloud-based CDS server), while in other embodiments at least one component of the at least one memory device resides outside of the housing of the POS terminal, the component of the POS terminal, the GPD, the component of the GPD, and/or the server (including the remote game server, the balance management server, and/or the cloud-based CDS server). In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the POS terminal, the component of the POS terminal, the GPD, the component of the GPD, and/or the server (including the remote game server, the balance management server, and/or the cloud-based CDS server); (2) associations between configuration indicia read from the POS terminal, the component of the POS terminal, the GPD, the component of the GPD, and/or the server (including the remote game server, the balance management server, and/or the cloud-based CDS server) with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the POS terminal, the component of the POS terminal, the GPD, the component of the GPD, and/or the server (including the remote game server, the balance management server, and/or the cloud-based CDS server) to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions that when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the POS terminal, the component of the POS terminal, the GPD, the component of the GPD, and/or the server (including the remote game server, the balance management server, and/or the cloud-based CDS server) to control the POS terminal, the component of the POS terminal, the GPD, the component of the GPD, and/or the server (including the remote game server, the balance management server, and/or the cloud-based CDS server). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a retail patron uses such a removable memory device in a component of the gaming establishment fund management system to implement at least part of the present disclosure. In other embodiments, part or all of the program code and/or the operating data is downloaded to the at least one memory device of the POS terminal, the component of the POS terminal, the GPD, the component of the GPD, and/or the server (including the remote game server, the balance management server, and/or the cloud-based CDS server) through any suitable data network described above (such as an Internet or intranet).

The at least one memory device also stores a plurality of device drivers. Examples of different types of device drivers include device drivers for the POS terminal, the component of the POS terminal, the GPD, the component of the GPD, and/or the server (including the remote game server, the balance management server, and/or the cloud-based CDS server) and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the POS terminal, the component of the POS terminal, the GPD, the component of the GPD, and/or the server (including the remote game server, the balance management server, and/or the cloud-based CDS server). Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the POS terminal, the component of the POS terminal, the GPD, the component of the GPD, and/or the server (including the remote game server, the balance management server, and/or the cloud-based CDS server) loads the new device driver from the at least one memory device to enable communication with the new device. For instance, one type of card reader in the POS terminal, the component of the POS terminal, the GPD, the component of the GPD, and/or the server (including the remote game server, the balance management server, and/or the cloud-based CDS server) can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the POS terminal, the component of the POS terminal, the GPD, the component of the GPD, and/or the server (including the remote game server, the balance management server, and/or the cloud-based CDS server) and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

The at least one output device includes at least one display device configured to display any suitable information associated with any transaction occurring at the POS terminal, any game(s) displayed by the GPD, any suitable information associated with such game(s) displayed by the GPD. In certain embodiments, the display devices are connected to or mounted on a housing of the GPD and/or POS terminal. In various embodiments, the display devices serve as digital glass configured to advertise certain games or other aspects of the venue in which the GPD and/or POS terminal is located. In various embodiments, the GPD and/or POS terminal includes one or more of the following display devices: (a) a central display device; (b) a player tracking display configured to display various information regarding a user's player tracking status; (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electronemitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the GPD and/or POS terminal are configured to display any suitable gaming or non-gaming information, including one or more game and/or non-game images, symbols, and indicia. In certain embodiments, the display devices of the GPD and/or POS terminal are configured to display any suitable visual representation or exhibition of the movement of objects; dynamic lighting; video images; images of people, characters, places, things, and faces of cards; and the like. In certain embodiments, the display devices of the GPD are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device includes a payout device. In these embodiments, after the GPD and/or POS terminal receives an actuation of a cashout device, the GPD and/or POS terminal causes the payout device to provide a payment to the user. In one embodiment, the payout device is one or more of: (a) a winnings ticket voucher printer and dispenser configured to print and dispense a winnings ticket voucher associated with a monetary value, wherein the winnings ticket voucher may be redeemed for its monetary value via a cashier, a kiosk, or other suitable redemption system; (b) a gameplay ticket voucher printer and dispenser (which may be the same or different from the winnings ticket voucher printer and dispenser) configured to print and dispense a gameplay ticket voucher associated with, in certain instances, no monetary value but redeemable for an amount of gameplay associated with a committed monetary value; (c) a bill dispenser configured to dispense paper currency; (d) a coin dispenser configured to dispense coins or tokens (such as into a coin payout tray); and (e) any suitable combination thereof.

In certain embodiments, rather than dispensing bills, coins, a physical winnings ticket voucher having a monetary value, and/or a physical gameplay ticket voucher having no monetary value, to the user following receipt of an actuation of the cashout device, the payout device is configured to cause a payment to be provided to the user in the form of an electronic funds transfer, such as via a direct deposit into a bank account, a fund management system account, or a prepaid account of the user; via a transfer of funds onto an electronically recordable identification card or smart card of the user; via sending a virtual winnings ticket voucher having a monetary value to an electronic device of the user; or via sending a virtual gameplay ticket voucher having no monetary value (but rather being associated with a committed amount of monetary funds for plays of lottery games) to an electric device of the user. In certain embodiments, the at least one output device is a sound generating device controlled by one or more sound cards. In one such embodiment, the sound generating device includes one or more speakers or other sound generating hardware and/or software configured to generate sounds, such as by playing music for any games or by playing music for other modes of the GPD and/or POS terminal, such as an attract mode. In another such embodiment, the GPD and/or POS terminal provides dynamic sounds coupled with attractive multimedia images displayed on one or more of the display devices to provide an audio-visual representation or to otherwise display full-motion video with sound to attract users to the GPD and/or POS terminal. In certain embodiments, the GPD and/or POS terminal displays a sequence of audio and/or visual attraction messages during idle periods to attract potential users to the GPD and/or POS terminal. The videos may be customized to provide any appropriate information.

The at least one input device may include any suitable device that enables an input signal to be produced and received by the at least one processor of the GPD and/or POS terminal. In one embodiment, the at least one input device includes a payment device configured to communicate with the at least one processor of the GPD and/or POS terminal to fund the GPD and/or POS terminal. In certain embodiments, the payment device includes one or more of: (a) a bill acceptor into which paper money is inserted to fund the GPD and/or POS terminal; (b) a ticket voucher acceptor into which a ticket voucher or a voucher is inserted to fund the GPD and/or POS terminal; (c) a coin slot into which coins or tokens are inserted to fund the GPD and/or POS terminal; (d) a reader or a validator for credit cards, debit cards, or credit slips into which a credit card, debit card, or credit slip is inserted to fund the GPD and/or POS terminal; (e) a user identification card reader into which a user identification card is inserted to fund the GPD and/or POS terminal; or (f) any suitable combination thereof. In one embodiment, the at least one input device includes a payment device configured to enable the GPD and/or POS terminal to be funded via an electronic funds transfer, such as a transfer of funds from a bank account and/or a fund management system account. In another embodiment, the GPD and/or POS terminal includes a payment device configured to communicate with a mobile device of a user, such as a mobile phone, a radio frequency identification tag, or any other suitable wired or wireless device, to retrieve relevant information associated with that user to fund the GPD and/or POS terminal. In certain embodiments, the at least one input device includes at least one wagering or betting device. In various embodiments, the one or more wagering or betting devices are each: (1) a mechanical button supported by the housing of the GPD (such as a hard key or a programmable soft key), or (2) an icon displayed on a display device of the GPD that is actuatable via a touch screen of the GPD or via use of a suitable input device of the GPD (such as a mouse or a joystick). One such wagering or betting device is as a maximum wager or bet device that, when actuated, causes the GPD to operate with the remote game server (which operates with the balance management server) to attempt to place a maximum wager on a play of a game. Another such wagering or betting device is a repeat bet device that, when actuated, causes the GPD to operate with the remote game server (which operates with the balance management server) to attempt to place a wager that is equal to the previously-placed wager on a play of a game. A further such wagering or betting device is a bet one device that, when actuated, causes the GPD to operate with the remote game server (which operates with the balance management server) to attempt to increase the wager by one credit. In various embodiments, the at least one input device includes at least one game play activation device. In various embodiments, the one or more game play initiation devices are each: (1) a mechanical button supported by the housing of the GPD (such as a hard key or a programmable soft key), or (2) an icon displayed on a display device of the GPD that is actuatable via a touch screen of the GPD or via use of a suitable input device of the GPD (such as a mouse or a joystick). After a user appropriately funds the balance maintained by the balance management server and displayed by the GPD and the GPD operates with the remote game server (which operates with the balance management server) to authorize the placement of a wager, the GPD activates the game play activation device to enable the user to actuate the game play activation device to initiate a play of a game on the GPD (or another suitable sequence of events associated with the GPD). After the GPD receives an actuation of the game play activation device, the GPD operates with the remote game server to initiate the play of the game.

In other embodiments, the at least one input device includes a cashout device. In various embodiments, the cashout device is: (1) a mechanical button supported by the housing of the GPD and/or POS terminal (such as a hard key or a programmable soft key), or (2) an icon displayed on a display device of the GPD and/or POS terminal that is actuatable via a touch screen of the GPD and/or POS terminal or via use of a suitable input device of the GPD and/or POS terminal (such as a mouse or a joystick). When the GPD and/or POS terminal receives an actuation of the cashout device from a user and the GPD and/or POS terminal user has a positive (i.e., greater-than-zero) balance (such as determined by the GPD in association with the balance management server), the GPD and/or POS terminal initiates a payout associated with the user's displayed balance. In various embodiments, the at least one input device includes a plurality of buttons that are programmable by the GPD and/or POS terminal operator to, when actuated, cause the GPD and/or POS terminal to perform particular functions. For instance, such buttons may be hard keys, programmable soft keys, or icons icon displayed on a display device of the GPD and/or POS terminal that are actuatable via a touch screen of the GPD and/or POS terminal (or via use of a suitable input device of the GPD and/or POS terminal (such as a mouse or a joystick). In certain embodiments, the at least one input device includes a touch-screen coupled to a touch-screen controller or other touch-sensitive display overlay to enable interaction with any images displayed on a display device. One such input device is a conventional touch-screen button panel. The touch-screen and the touch-screen controller are connected to a video controller. In these embodiments, signals are input by touching the touch screen at the appropriate locations.

In embodiments including a player tracking system, the at least one input device includes a card reader in communication with the at least one processor of the GPD and/or POS terminal. The card reader is configured to read a user identification card inserted into the card reader.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more nearby user input devices. In one embodiment, a user input device docking region is provided, and includes a power distribution component that is configured to recharge a user input device without requiring metal-to-metal contact. In one embodiment, the at least one power distribution component is configured to distribute power to one or more internal components, such as one or more rechargeable power sources (e.g., rechargeable batteries).

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the GPD and/or POS terminal; detecting the presence and/or identity of various persons (e.g., users, employees, etc.), devices (e.g., user input devices), and/or systems within a predetermined proximity to the GPD and/or POS terminal.

The at least one data preservation component is configured to detect or sense one or more events and/or conditions that, for example, may result in damage to any component of the system and/or that may result in loss of information associated with any component of the system. Additionally, the data preservation system may be operable to initiate one or more appropriate action(s) in response to the detection of such events/conditions.

The at least one motion/gesture analysis and interpretation component is configured to analyze and/or interpret information relating to detected user movements and/or gestures to determine appropriate user input information relating to the detected user movements and/or gestures. For example, in one embodiment, the at least one motion/gesture analysis and interpretation component is configured to perform one or more of the following functions: analyze the detected gross motion or gestures of a user; interpret the user's motion or gestures (e.g., in the context of a game being played) to identify instructions or input from the user; utilize the interpreted instructions/input to advance the game state; etc. In other embodiments, at least a portion of these additional functions may be implemented at a remote system or device.

The at least one portable power source enables any component of the system to operate in a mobile environment. The at least one geolocation module is configured to acquire geolocation information from one or more remote sources and use the acquired geolocation information to determine information relating to a relative and/or absolute position of the GPD and/or POS terminal. For example, in one implementation, the at least one geolocation module is configured to receive GPS signal information for use in determining the position or location of the GPD and/or POS terminal. In another implementation, the at least one geolocation module is configured to receive multiple wireless signals from multiple remote devices (e.g., GPD and/or POS terminals, servers, wireless access points, etc.) and use the signal information to compute position/location information relating to the position or location of the GPD and/or POS terminal.

The at least one user identification module is configured to determine the identity of the current user of the GPD and/or POS terminal. For example, in one embodiment, the current user is required to perform a login process at the GPD and/or POS terminal to access one or more features. Alternatively, the GPD and/or POS terminal is configured to automatically determine the identity of the current user based on one or more external signals, such as an RFID tag or badge worn by the current user and that provides a wireless signal to the GPD and/or POS terminal that is used to determine the identity of the current user. In at least one embodiment, various security features are incorporated into the GPD and/or POS terminal to prevent unauthorized users from accessing confidential or sensitive information.

The at least one information filtering module is configured to perform filtering (e.g., based on specified criteria) of selected information to be displayed at one or more displays of any component of the system.

In various embodiments, one or more components of the system each includes a plurality of communication ports configured to enable the at least one processor of that component to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket voucher readers, touch screens, trackballs, touchpads, wheels, and wireless communication devices.

In certain embodiments, in addition to (or alternative from) providing predetermined game outcomes, the remote game server randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the remote game server generates the game outcome(s) and/or the award(s) to be provided based on the associated probabilities. In these embodiments, since the remote game server generates game outcomes and/or awards randomly or based on one or more probability calculations, there is no certainty that the system will ever provide any specific game outcome and/or award.

In various embodiments, the value component of one or more predetermined game outcomes determined from a game outcome seed includes a progressive award. A progressive award includes an initial amount and an additional amount funded through a portion of each wager placed to initiate a play of a primary game. When one or more triggering events occurs, such as a designated game outcome seed is selected by the cloud-based CDS server, the GPD operates with the remote game server and the balance management server to provide at least a portion of the progressive award. After the progressive award is provided, an amount of the progressive award is reset to the initial amount and a portion of each subsequent wager is allocated to the next progressive award.

In certain embodiments, the GPD operates with the remote game server and the balance management server to communicate with a social network server that hosts or partially hosts a social networking website via a data network (such as the Internet) to integrate a user's gaming experience with the user's social networking account. This enables the GPD to operate with the remote game server and the balance management server to send certain information to the social network server that the social network server can use to create content (such as text, an image, and/or a video) and post it to the user's wall, newsfeed, or similar area of the social networking website accessible by the user's connections (and in certain cases the public) such that the user's connections can view that information. This also enables the GPD to operate with the remote game server and the balance management server to receive certain information from the social network server, such as the user's likes or dislikes or the user's list of connections. In certain embodiments, the GPD to operate with the remote game server and the balance management server to enable the user to link the user's user account to the user's social networking account(s). This enables the GPD to operate with the remote game server and the balance management server to, once the user is identified and initiates a gaming session (such as via the user inserting the user's player tracking card into a GPD), link that gaming session to the user's social networking account(s). In other embodiments, the GPD operates with the remote game server and the balance management server to enable the user to link the user's social networking account(s) to individual gaming sessions when desired by providing the required login information. For instance, in one embodiment, if a user wins a particular award (e.g., a progressive award or a jackpot award) or an award that exceeds a certain threshold (e.g., an award exceeding $1,000), the system sends information about the award to the social network server to enable the server to create associated content (such as a screenshot of the outcome and associated award) and to post that content to the user's wall (or other suitable area) of the social networking website for the user's connections to see (and to entice them to play). In another embodiment, if a user joins a multiuser game and there is another seat available, the system sends that information to the social network sever to enable the server to create associated content (such as text indicating a vacancy for that particular game) and to post that content to the user's wall (or other suitable area) of the social networking website for the user's connections to see (and to entice them to fill the vacancy). In another embodiment, if the user consents, the system sends advertisement information or offer information to the social network server to enable the social network server to create associated content (such as text or an image reflecting an advertisement and/or an offer) and to post that content to the user's wall (or other suitable area) of the social networking website for the user's connections to see. In another embodiment, the system enables the user to recommend a game to the user's connections by posting a recommendation to the user's wall (or other suitable area) of the social networking website.

It should be appreciated that certain of the components of the present disclosure operate in certain manners that differentiate these systems from general purpose computing devices. That is, to satisfy security and regulatory requirements, hardware and/or software architectures are implemented in various component of the system of the present disclosure that differ significantly from those of general purpose computing devices. For example, certain components of the system are state-based systems. A state-based system stores and maintains its current state in a non-volatile memory such that, in the event of a power failure or other malfunction, the state-based system can return to that state when the power is restored or the malfunction is remedied. For instance, if a GPD displays an award associated with a predetermined game outcome but the power to the GPD fails before the GPD provides the award to the user, the GPD (and/or the cloud-based CDS server and/or the remote game server) stores the pre-power failure state in a non-volatile memory, such that the GPD returns to that state upon restoration of power, and provides the award to the user. This requirement affects the software and hardware design on certain components of the system. General purpose computing devices are not state-based machines, and a majority of data is usually lost when a malfunction occurs on a general purpose computing device.

In another example, for regulatory purposes, the software being executed by the remote game server and/or the cloud-based CDS server utilized to operate the GPD has been designed to be static and monolithic to prevent cheating by an operator. For instance, prevent cheating and to satisfy regulatory requirements, the remote game server and/or the cloud-based CDS server uses a proprietary processor running instructions to provide the game employing predetermined game outcomes from an EPROM or other form of non-volatile memory. The coding instructions on the EPROM are static (non-changeable) and must be approved by regulators in a particular jurisdiction and installed in the presence of a person representing that jurisdiction. Any changes to any part of the software required to provide a predetermined game outcome, such as adding a new device driver used to operate a device during selection of a game outcome seed, can require burning a new EPROM approved by the jurisdiction and reinstalling the new EPROM in the presence of a regulator. Regardless of whether the EPROM solution is used, to gain approval in most jurisdictions, the cloud-based CDS server and/or the remote game server must demonstrate sufficient safeguards that prevent an operator or a user from manipulating the component's hardware and software in a manner that gives him an unfair, and in some cases illegal, advantage.

Another difference between certain components and general purpose computing devices is authentication—such components of the system store code that is configured to be authenticated to determine if the code is unaltered before executing the code. If the code has been altered, the component prevents the code from being executed. The code authentication requirements affect both hardware and software designs. Certain components use hash functions to authenticate code. For instance, a cloud-based CDS server stores game program code, a hash function, and an authentication hash (which may be encrypted). Before executing the game program code, the cloud-based CDS server hashes the game program code using the hash function to obtain a result hash and compares the result hash to the authentication hash. If the result hash matches the authentication hash, the cloud-based CDS server determines that the game program code is valid and executes the program code to selected the game outcome seed. If the result hash does not match the authentication hash, the cloud-based CDS server determines that the game program code has been altered (i.e., may have been tampered with) and prevents execution of the program code.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
a processor; and
a memory device that stores a plurality of instructions that, when executed by the processor, cause the processor to:
responsive to a receipt of data associated with a redemption of a gameplay ticket voucher issued from a point-of-sale terminal, communicate data that results in a display device of a game presentation device displaying, based on a first amount of non-cashable funds associated with the gameplay ticket voucher, a modification of a first balance of non-cashable funds dedicated to a quantity of plays of lottery games offered by a lottery authority, wherein when redeemed, the gameplay ticket voucher is independent of any individual plays of any individual lottery games, and
responsive to a receipt of data associated with an input to allocate at least part of the first amount of non-cashable funds associated with the gameplay ticket voucher to a play of a lottery game offered by the lottery authority and a determination that the first balance of non-cashable funds at least equals a cost associated with the play of the lottery game:
communicate, to a remote game server, data authorizing the play of the lottery game,
communicate data that results in the display device of the game presentation device displaying, based on the cost associated with the play of the lottery game, a further modification of the first balance of non-cashable funds, and
responsive to a receipt, from the remote game server, of data associated with a predetermined game outcome associated with a game outcome seed selected by a cloud-based central determination system server from a set of game outcome seeds, communicate data that results in the display device of the game presentation device displaying, based on any value component associated with the predetermined game outcome, a modification of a second balance of a first amount of cashable funds.

2. The system of claim 1, wherein the gameplay ticket voucher comprises a virtual gameplay ticket voucher.

3. The system of claim 1, wherein the memory device stores a plurality of further instructions that, when executed by the processor, cause the processor to enable a transfer of a second amount of cashable funds from the second balance displayed by the display device of the game presentation device to the first balance displayed by the display device of the game presentation device such that after the transfer, the second amount of cashable funds is converted to a second amount of non-cashable funds.

4. The system of claim 3, wherein the memory device stores a plurality of further instructions that, when executed by the processor, cause the processor to cause the automatic transfer the second amount of cashable funds from the second balance displayed by the display device of the game presentation device to the first balance displayed by the display device of the game presentation device responsive to the determination being that the first balance of non-cashable funds displayed by the display device of the game presentation device is less than the cost associated with the play of the lottery game.

5. The system of claim 1, wherein the memory device stores a plurality of further instructions that, when executed by the processor, cause the processor to communicate data associated with the play of the lottery game, the data comprising at least one of: the first balance of non-cashable funds prior to the further modification, the first balance of non-cashable funds after the further modification, the second balance of cashable funds prior to the display of the predetermined game outcome, the second balance of cashable funds after the display of the predetermined game outcome, the cost associated with the play of the lottery game, the predetermined game outcome, and any value component associated with the predetermined game outcome.

6. The system of claim 1, wherein the play of the lottery game comprises an instant ticket lottery game.

7. The system of claim 1, wherein the quantity of plays of lottery games comprises a single play.

8. The system of claim 1, wherein the predetermined game outcome is displayed by the display device of the game presentation device as an outcome associated with a play of a game displaying a plurality of symbols at a plurality of symbol display positions associated with a plurality of reels.

9. A system comprising:
a processor; and
a memory device that stores a plurality of instructions that, when executed by the processor, cause the processor to:
communicate, to a balance management server, a request to allocate at least part of a first amount of non-cashable funds associated with a gameplay ticket voucher to a play of a lottery game offered by a lottery authority, the gameplay ticket voucher being issued by a point-of-sale terminal and redeemed in association with a game presentation device, wherein when redeemed, the gameplay ticket voucher is independent of any individual plays of any individual lottery games and the first amount of non-cashable funds is dedicated to funding plays of lottery games offered by the lottery authority, and
responsive to a receipt, from the balance management server, of an authorization of the request:
communicate, to a cloud-based central determination system server, a request for a game outcome seed from a set of game outcome seeds, and
responsive to a receipt, from the cloud-based central determination system server, of data associated with the game outcome seed:
determine a predetermined game outcome from the data associated with the game outcome seed,
communicate data that results in a display device of the game presentation device displaying the predetermined game outcome, and
communicate, to the balance management server, data associated with any value component of the predetermined game outcome.

10. The system of claim 9, wherein the processor comprises a cloud-based processor.

11. The system of claim 9, wherein the game presentation device comprises a mobile device.

12. The system of claim 9, wherein the game outcome seed is prevented from being selected again from the set of game outcome seeds.

13. A method of operating a system, the method comprising:
responsive to a receipt of data associated with a redemption of a gameplay ticket voucher issued from a point-of-sale terminal, communicating data that results in a display device of a game presentation device displaying, based on a first amount of non-cashable funds associated with the gameplay ticket voucher, a modification of a first balance of non-cashable funds dedicated to a quantity of plays of lottery games offered by a lottery authority, wherein when redeemed, the gameplay ticket voucher is independent of any individual plays of any individual lottery games, and
responsive to a receipt of data associated with an input to allocate at least part of the first amount of non-cashable funds associated with the gameplay ticket voucher to a play of a lottery game offered by the lottery authority and a determination that the first balance of non-cashable funds at least equals a cost associated with the play of the lottery game:
communicating, to a remote game server, data authorizing the play of the lottery game,
communicating data that results in the display device of the game presentation device displaying, based on the cost associated with the play of the lottery game, a further modification of the first balance of non-cashable funds, and
responsive to a receipt, from the remote game server, of data associated with a predetermined game outcome associated with a game outcome seed selected by a cloud-based central determination system server from a set of game outcome seeds, communicating data that results in the display device of the game presentation device displaying, based on any value component associated with the predetermined game outcome, a modification of a second balance of a first amount of cashable funds.

14. The method of claim 13, wherein the gameplay ticket voucher comprises a virtual gameplay ticket voucher.

15. The method of claim 13, further comprising enabling, by a processor, a transfer of a second amount of cashable funds from the second balance displayed by the display device of the game presentation device to the first balance displayed by the display device of the game presentation device such that after the transfer, the second amount of cashable funds is converted to a second amount of non-cashable funds.

16. The method of claim 15, further comprising causing, by the processor, the automatic transfer the second amount of cashable funds from the second balance displayed by the display device of the game presentation device to the first balance displayed by the display device of the game presentation device responsive to the determination being that the first balance of non-cashable funds displayed by the display device of the game presentation device is less than the cost associated with the play of the lottery game.

17. The method of claim 13, further comprising communicating data associated with the play of the lottery game, the data comprising at least one of: the first balance of non-cashable funds prior to the further modification, the first balance of non-cashable funds after the further modification, the second balance of cashable funds prior to the display of the predetermined game outcome, the second balance of cashable funds after the display of the predetermined game outcome, the cost associated with the play of the lottery game, the predetermined game outcome, and any value component associated with the predetermined game outcome.

18. The method of claim 13, wherein the play of the lottery game comprises an instant ticket lottery game.

19. The method of claim 13, wherein the quantity of plays of lottery games comprises a single play.

20. The method of claim 13, wherein the predetermined game outcome is displayed by the display device of the game presentation device as an outcome associated with a play of a game displaying a plurality of symbols at a plurality of symbol display positions associated with a plurality of reels.

\* \* \* \* \*